(12) United States Patent
Haseltine et al.

(10) Patent No.: US 10,424,295 B2
(45) Date of Patent: Sep. 24, 2019

(54) CALIBRATION OF VIRTUAL IMAGE DISPLAYS

(71) Applicant: Disney Enterprises, Inc., Burbank, CA (US)

(72) Inventors: Eric C. Haseltine, Silver Spring, MD (US); Michael P. Goslin, Sherman Oaks, CA (US); Joseph L. Olson, Eagle Rock, CA (US)

(73) Assignee: Disney Enterprises, Inc., Burbank, CA (US)

( * ) Notice: Subject to any disclaimer, the term of this patent is extended or adjusted under 35 U.S.C. 154(b) by 56 days.

(21) Appl. No.: 15/389,375

(22) Filed: Dec. 22, 2016

(65) Prior Publication Data
US 2017/0221273 A1    Aug. 3, 2017

Related U.S. Application Data

(60) Provisional application No. 62/290,859, filed on Feb. 3, 2016.

(51) Int. Cl.
*G09G 5/38* (2006.01)
*G10L 15/22* (2006.01)
(Continued)

(52) U.S. Cl.
CPC ............ *G10L 15/22* (2013.01); *A63F 13/212* (2014.09); *A63F 13/25* (2014.09); *G02B 27/0172* (2013.01); *G06F 3/011* (2013.01); *G06F 3/013* (2013.01); *G06T 19/20* (2013.01); *G09G 5/38* (2013.01); *A63F 13/537* (2014.09); *A63F 13/54* (2014.09); *G02B 2027/014* (2013.01);
(Continued)

(58) Field of Classification Search
None
See application file for complete search history.

(56) References Cited

U.S. PATENT DOCUMENTS 8,704,882 B2    4/2014    Turner
9,213,163 B2    12/2015   Lewis et al.
(Continued)

OTHER PUBLICATIONS

S.J. Gilson, A.W. Fitzgibbon, A. Glennerster; Spatial calibration of an optical see-through head-mounted display; J Neurosci Methods, 173 (1) (2008), pp. 140-146.
Livingston MA, Ellis SR, White SM, Feiner SK, Lederer A. Vertical vergence calibration for augmented reality displays. In Virtual Reality Conference, 2006 Mar. 25, 2006 (pp. 287-288). IEEE.

*Primary Examiner* — Xiao M Wu
*Assistant Examiner* — Steven Z Elbinger
(74) *Attorney, Agent, or Firm* — Patterson + Sheridan, LLP

(57) ABSTRACT

Systems, methods and articles of manufacture for calibrating an augmented reality headset. Embodiments output for display in the augmented reality headset, a plurality of reference points, where the augmented reality headset is adapted to further display a fixed reference line. A user selection of a first one of the plurality of reference points that appears closest to the fixed reference line is received, and a calibration profile for the augmented reality headset is generated based on the user selection of the first reference point. Embodiments render one or more frames for display, in which a depiction of at least one virtual object within the one or more frames is dynamically generated based at least in part on the calibration profile.

20 Claims, 15 Drawing Sheets

(51) Int. Cl.

| | |
|---|---|
| *G06F 3/01* | (2006.01) |
| *A63F 13/25* | (2014.01) |
| *A63F 13/212* | (2014.01) |
| *G02B 27/01* | (2006.01) |
| *G06T 19/20* | (2011.01) |
| G10L 15/26 | (2006.01) |
| A63F 13/537 | (2014.01) |
| A63F 13/54 | (2014.01) |
| G06F 3/0484 | (2013.01) |
| G06F 3/16 | (2006.01) |

(52) U.S. Cl.
CPC .......... *G06F 3/04842* (2013.01); *G06F 3/165* (2013.01); *G06T 2200/24* (2013.01); *G10L 15/265* (2013.01); *G10L 2015/223* (2013.01)

(56) References Cited

U.S. PATENT DOCUMENTS

| | | |
|---|---|---|
| 9,285,592 B2 | 3/2016 | Olsson et al. |
| 2005/0270284 A1* | 12/2005 | Martin ............... H04N 13/0011 345/419 |
| 2009/0243967 A1 | 10/2009 | Kato |
| 2010/0289880 A1 | 11/2010 | Moliton et al. |
| 2012/0050144 A1* | 3/2012 | Morlock ............... G06T 19/006 345/8 |
| 2014/0333665 A1* | 11/2014 | Sylvan ............... G02B 27/0149 345/633 |
| 2016/0012643 A1* | 1/2016 | Kezele ................. G06T 19/006 345/633 |

\* cited by examiner

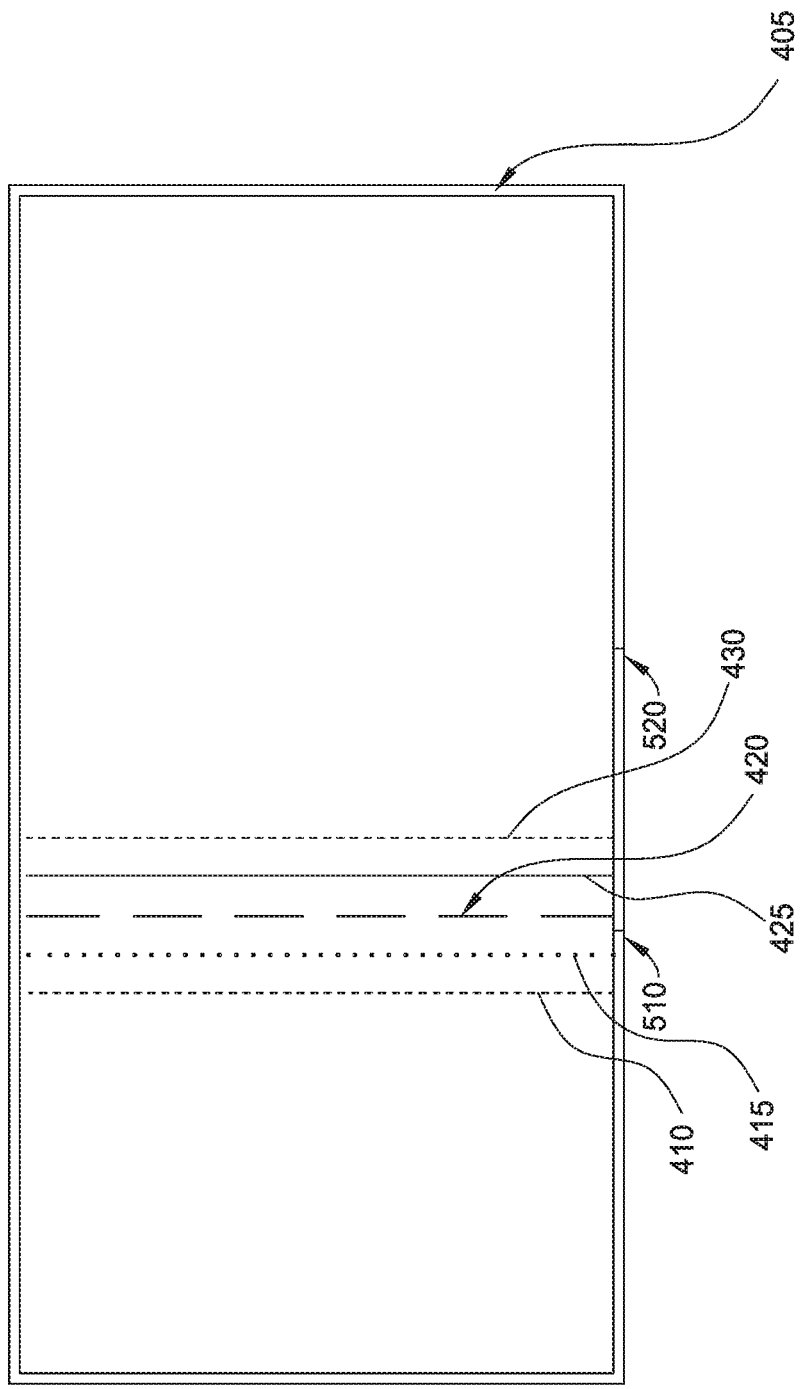

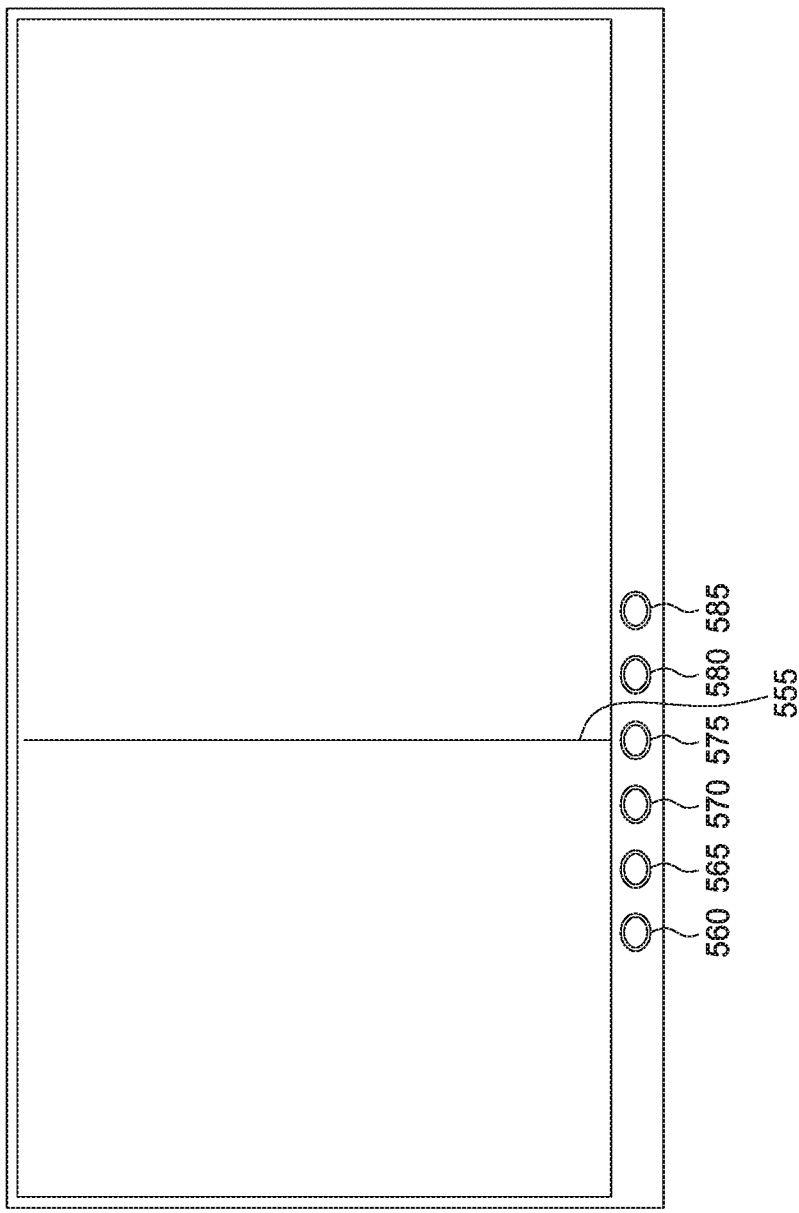

CALIBRATION OF VIRTUAL IMAGE DISPLAYS

CROSS-REFERENCE TO RELATED APPLICATIONS

This application claims benefit of U.S. provisional patent application Ser. No. 62/290,859, filed Feb. 3, 2016, which is herein incorporated by reference in its entirety.

BACKGROUND

Field of the Invention

The present invention generally relates to entertainment systems, and more specifically to techniques for calibrating an augmented reality headset coupled with a mobile device.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Modern technologies such as augmented reality devices enable game developers to create games that exist outside of traditional video game platforms (e.g., where the virtual world is solely output through a display device). Using such technologies, virtual characters and other virtual objects can be made to appear as if they are present within the physical world. In such augmented reality experiences, it is generally preferable for the virtual character to be rendered with realistic dimensions and positioning, in order to enhance the illusion that the characters are truly present within the physical world.

SUMMARY

One embodiment provides a method of calibrating an augmented reality headset. The method includes outputting for display in the augmented reality headset, a plurality of reference points, where the augmented reality headset is adapted to further display a fixed reference line. The method also includes receiving a user selection of a first one of the plurality of reference points that appears closest to the fixed reference line. Additionally, the method includes generating a calibration profile for the augmented reality headset based on the user selection of the first reference point. The method further includes rendering one or more frames for display, in which a depiction of at least one virtual object within the one or more frames is dynamically generated based at least in part on the calibration profile.

Another embodiment provides a non-transitory computer-readable medium containing computer program code that, when executed by operation of one or more computer processors, performs an operation for calibrating an augmented reality headset. The operation includes outputting for display in the augmented reality headset, a plurality of reference points, where the augmented reality headset is adapted to further display a fixed reference line. The operation also includes receiving a user selection of a first one of the plurality of reference points that appears closest to the fixed reference line. Additionally, the operation includes generating a calibration profile for the augmented reality headset based on the user selection of the first reference point. The operation further includes rendering one or more frames for display, in which a depiction of at least one virtual object within the one or more frames is dynamically generated based at least in part on the calibration profile.

Yet another embodiment provides an augmented reality headset that includes one or more computer processors and a memory containing computer program code that, when executed by operation of the one or more computer processors, performs an operation for calibrating an augmented reality headset. The operation includes outputting for display in the augmented reality headset, a plurality of reference points, where the augmented reality headset is adapted to further display a fixed reference line. The operation also includes receiving a user selection of a first one of the plurality of reference points that appears closest to the fixed reference line. Additionally, the operation includes generating a calibration profile for the augmented reality headset based on the user selection of the first reference point. The operation further includes rendering one or more frames for display, in which a depiction of at least one virtual object within the one or more frames is dynamically generated based at least in part on the calibration profile.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIGS. 5A-C illustrate display interfaces for calibrating the inter-pupillary distance of a user using physical reference markers, according to embodiments described herein.

DETAILED DESCRIPTION

Figure 1:
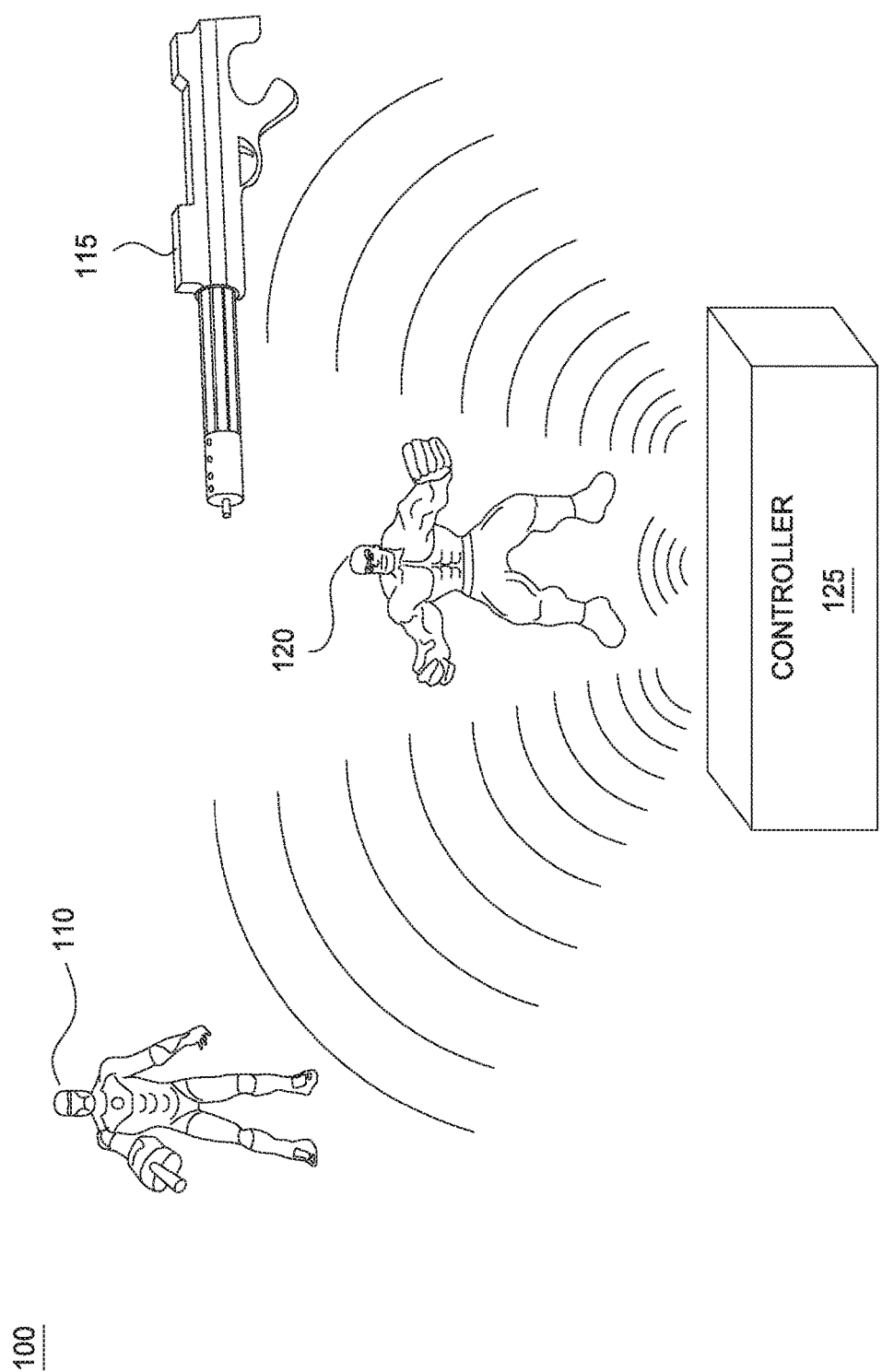
FIG. 1 illustrates a playtime environment in which a controller is instructing interactive devices, according to one embodiment described herein.

Generally, embodiments described herein provide techniques for calibrating an augmented reality headset for a particular user. One embodiment provides an augmented reality headset that is configured to leverage the display device of a mobile device. For example, the augmented reality headset could include a slot into which the user can insert a mobile device, and could include a beam-splitter configured to direct the light from the display device of the mobile device into the user's field of view of the physical environment while wearing the headset. Doing so provides an augmented reality experience for the user by enabling objects shown on the display device to appear as if they are present within the physical environment.

Embodiments described herein provide techniques for calibrating the display of the mobile device for a given user wearing the headset. Generally, the orientation of the user's eyes to the virtual objects shown within the augmented reality headset can affect the user's experience while wearing the headset in a number of different ways. For instance, a user may experience discomfort when wearing an augmented reality headset, if the headset is not properly calibrated for the user. As an example, the headset may fit the user properly, but the user's eyes may not properly align to the objects due to the user having a greater or lesser inter-pupillary distance (i.e., the distance between the user's eyes and the middle of the user's face), relative to the device's default configuration. Such misalignment may also affect the alignment of the virtual objects, relative to physical objects within the physical environment. That is, the augmented reality software executing on the mobile device may render virtual objects at positions based on the user's eyes being properly aligned. However, due to the user's eyes being misaligned, the virtual objects may appear in different positions, relative to physical objects in the physical environment, when viewed by the user. Misalignment can also cause parallax errors (e.g., barrel distortion, pincushion distortion, etc.) of the virtual objects when viewed by the user wearing the augmented reality headset. This in turn can affect the user's enjoyment of the augmented reality headset, as virtual objects may appear to the user as located in unrealistic positions (e.g., within physical objects, standing off of physical surfaces, etc.) and as having unrealistic shapes.

As such, embodiments provide techniques for calibrating an augmented reality headset for a particular user. Two or more physical reference markers can be provided within an augmented reality headset. For example, the physical reference markers can be provided on a physical surface within the augmented reality headset, at a position that is generally outside of the user's field of view, to minimize any distraction to the user during the augmented reality experience. In one embodiment, a calibration component executing on the mobile device is configured to output for display two or more reference lines, each corresponding to a respective one of the physical reference markers. For example, the augmented reality headset could be configured with two physical reference markers, each corresponding to a respective eye of the user, and the calibration component could output two vertical lines on the display of the mobile device inserted into the augmented reality device.

The calibration component could provide an interface through which the user can adjust the horizontal position of each of the depicted reference lines. For example, the calibration component could detect commands from the user by monitoring the user's speech using one or more microphone sensors of the mobile device. For instance, responsive to detecting the user spoke the command of "left," the calibration component could adjust a horizontal position of the references lines in the leftward direction. Likewise, if the calibration component detects a command of "right" spoken by the user, the calibration component could adjust the position of the reference lines in the rightward direction. This process could continue until the user has aligned the depicted reference lines with the physical reference markers.

The augmented reality software on the mobile device could then use the positions of the adjusted reference lines to provide an improved augmented reality experience for the user wearing the headset. For example, the augmented reality software could determine a position of each of the user's eyes relative to the displayed images of the augmented reality headset, based on the positions of the adjusted reference lines and predefined information about the fixed positioning of the physical reference markers. The augmented reality software could then use this calibration information in rendering virtual objects for display in the augmented reality headset. For example, the augmented reality software could adjust the positioning of one or more virtual objects within a three-dimensional scene using the calibration information, so that the virtual objects appear to the user as properly positioned on a physical surface within the physical environment.

As another example, as discussed above, misalignment between the user's eyes and the augmented reality headset can result in parallax errors in virtual objects viewed by the user within the augmented reality headset. As such, the augmented reality software could use the calibration information as input to one or more shaders when rendering the virtual objects, in order to offset any parallax errors. For example, the augmented reality software could determine that the inter-pupillary distance for a particular user will result in a particular amount of pincushion distortion when a user views a virtual object displayed within the augmented reality headset. In response, the augmented reality software could apply a shader to apply a determined amount of barrel distortion to the virtual object, in order to offset the particular amount of pincushion distortion. As a result, the user of the augmented reality headset will see the rendered virtual object in its intended form, thereby improving the user's experience while wearing the augmented reality headset.

Particular embodiments are described herein with respect to an immersive storytelling environment in which a story is played back through the interaction of storytelling devices (also referred to as interactive devices). More specifically, embodiments may use various storytelling devices, each capable of producing some auditory and/or visual effect, to create an immersive and interactive storytelling experience for a user. Such a system may include a variety of storytelling devices and a controller, connected via a network (e.g., an RF communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audio-visual messages responsive to a certain stimulus event (e.g., a user performing a particular action), and to perform another action responsive to other stimulus (e.g., the user not performing the particular action within a predefined window of time). Generally, the controller may be one of the plurality of storytelling devices, or the controller could be a stand-alone device (e.g., a computing device executing a control application).

Generally, each of the storytelling devices can have different capabilities in terms of audio output devices and audio processing and storage capabilities. For instance, a first device may include multiple higher quality speakers and a greater amount of audio processing and storage resources, while another storytelling device can include a relatively limited speaker and relatively limited audio processing and storage resources. This could be because, for instance, higher quality speakers, processing and storage resources are generally more expensive, and it can be desirable for economic reasons for certain storytelling devices to be lower cost devices.

As a result, certain audio effects may have a higher quality sound when played using the hardware of a particular storytelling device, relative to when the audio effect is played using another storytelling device with more limited hardware. As such, embodiments can tailor audio output during a storytelling experience such that that an optimal device is selected for particular sound effects during the story. For instance, in a story, a particular audio effect could represent the virtual assistant's voice giving instructions and updates to the player as part of the story. As the character the virtual assistant is not represented by any of the storytelling devices used to play out the story, it could be thematically appropriate to output the audio effect representing the virtual assistant's voice through any of multiple storytelling devices used in the story. As such, embodiments could select one of the storytelling devices best suited to output the audio effect with the highest quality (e.g., the storytelling device having the speakers, processing and storage capabilities best suited for outputting the particular audio effect) and could instruct the selected device to output the audio effect. Moreover, such devices can be selected dynamically throughout the story, as devices may enter and exit the story playback for a variety of reasons (e.g., a new device is brought into the physical area where the story is being played out, a device runs out of battery power, etc.).

Additionally, in some cases the storytelling devices can be configured to work in unison to output a particular sound effect. For instance, a single sound effect could be output on multiple devices in unison in order to create a stereophonic or surround-sound experience for the user. In doing so, a slight time delay can be introduced in the playback of the sound effect across the multiple devices, to avoid phase cancellation between the sound effects being output by the devices. As another example, the devices can be configured to output the sound effect with a more significant time delay in order to create a particular auditory effect for the user. For example, in a story that simulates the user being within a bee hive, the various storytelling devices could each output the sound of a bee buzzing with a time delay in between the output of each of the devices, such that the sound of the bee buzzing appears to move throughout the physical environment. Thus, if the user is positioned between the various storytelling devices used in the playback of the story, the sound of the bee buzzing could appear to encircle the user, thus creating an immersive auditory experience for the user and enhancing the realism of the story.

Additionally, embodiments can include augmented reality devices together with various storytelling devices as part of an augmented reality gaming environment. As used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments elements using computer graphics technology. Such an augmented reality device may include a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

Additionally, the software could identify a first physical object within the visual scene captured by camera devices of the augmented reality device. For instance, embodiments could analyze the visual scene to determine the border edges of objects within the visual scene, and could use these border edges in order to identify one or more physical objects existing within the visual scene. Of note, as the captured visual scene represents a three-dimensional space (e.g., a physical environment captured using a camera of the augmented reality device), embodiments may be configured to estimate a three-dimensional space occupied by each of the physical objects within the captured scene. That is, the software could be configured to estimate the three-dimensional surfaces of physical objects within the captured scene.

In response to detecting a known physical object with the visual scene, the software could render one or more virtual characters based on the physical object's appearance within the captured frames. As an example, the augmented reality software could create a three-dimensional representation of the physical environment and could create a virtual object or character to insert within the three-dimensional representation. The software could position the created virtual object or character at a position within the three-dimensional scene, based on the depiction of the physical object within the captured frames. For example, the software could determine that the physical object is resting on a particular surface within the physical environment (e.g., a table surface, a floor, etc.), based on data about the size and shape of the physical object and the object's appearance within the captured frames. Upon identifying the physical surface, the software could position the virtual object or character within the three-dimensional scene, so that the virtual object or character is resting on the identified surface. Doing so creates a more realistic experience for the user.

Additionally, the software could scale the size of the virtual object or character based on the depiction of the physical object within the captured frames. For instance, the software could store predefined geometric data for the physical object, specifying a shape and dimensions of the physical object. The software could then use such information to determine how to size the virtual object or character in the three-dimensional scene. For example, assume the virtual object is a spherical object that is 12 inches in diameter. The software could determine a scaling for the virtual object based on the size of the physical object within the captured frames and the predefined geometric data specifying the physical object's known dimensions. As another example, the software could create a virtual character and could scale the size of the virtual character to life-size dimensions (e.g., the size of an average human being), using the size of the physical object within the captured frames and the predefined geometric data specifying the physical object's known dimensions. Doing so enables the augmented reality software to create a realistic and consistent depiction of the virtual object or character.

Generally, the augmented reality device can continue rendering frames of the three-dimensional scene interlaced with the frames captured by the camera sensors of the augmented reality device, in real-time, as the device (and the user of the device) moves throughout the physical environment. Advantageously, doing so provides a more immersive augmented reality experience for the user, as the user can paint the surfaces of objects within the augmented reality world and the user's painting will persist and remain accurate to the depicted physical environment, even when the environment is viewed from different perspectives using the augmented reality device.

An example will now be discussed with respect to FIG. 1, which illustrates a playtime environment in which a controller is instructing interactive devices to perform an effect, according to one embodiment described herein. As shown, the system 100 includes an action figure 110, a blaster rifle 115, a second action figure 120, and a controller device 125. Here, the toys 110, 115 and 120 are generally capable of producing audiovisual effects (e.g., audio output, light effects, movement effects such as vibration, etc.). In one embodiment, the toys 110, 115 and 120 may be configured with an action disc device (e.g., device 200 shown in FIG. 2 and discussed in more detail below). Of note, while various examples are discussed herein with respect to the toy devices 110, 115 and 120, it is broadly contemplated that these techniques can be utilized with any number of devices and any types of devices, consistent with the functionality described herein.

However, while the toys 110, 115 and 120 are capable of producing audiovisual effects, the toys 110, 115 and 120 may not be configured with logic to determine when conditions in the physical environment indicate a particular effect should be performed. This may be due to, in part, the cost and complexity of configuring each toy 110, 115 and 120 with the logic and hardware resources to detect stimuli in the physical environment and to perform a contextually appropriate audiovisual effect in response synchronously with other devices. As such, the toys 110, 115 and 120 could be configured to receive commands (e.g., from controller 125) and to perform an audiovisual effect(s) responsive to the received commands. Doing so allows the toys 110, 115 and 120 to be produced much more economically, while maintaining the capability to perform audiovisual effect(s) as part of a storytelling or playtime experience.

For example, as part of a storytelling experience, the storyline could indicate that devices within the physical environment should play a particular sound effect when the user performs a predefined gesture to use telekinetic super powers. As such, the controller 125 could monitor the user's behavior to detect when the user has performed the predefined gesture. For example, the controller 125 could use one or more camera devices (e.g., within the controller devices 125, within one or more of the toys 110, 115 and 120, etc.) to monitor the user's movement within the physical environment. As another example, the user could wear an article (e.g., a bracelet) configured with an accelerometer device and capable of reporting data describing the user's movement to the controller device 125.

Upon detecting the user has performed the predefined gesture, the controller 125 could broadcast a command to the toy devices 110, 115 and 120, instructing the toy devices 110, 115 and 120 to synchronously perform an audiovisual effect. Such a command could be broadcast, for example, via a radio-frequency transmitter, an infrared emitter, an ultrasound transmitter, and so on. More generally, any communications protocol may be used for the communication between the controller and the toy devices 110, 115 and 120, consistent with the functionality described herein.

The toy devices 110, 115 and 120 could then receive the command and could perform the specified audiovisual effect in synchrony. For example, in the event the command specifies to play a particular sound effect, each of the toy devices 110, 115 and 120 could output the particular sound effect in synchrony with the other toy devices, thereby creating an improved sensorial experience for the user, relative to any of the toy devices 110, 115 and 120 playing the sound effect individually. Here, the sound effect could be, e.g., a sampled sound effect or a function-generated sound effect. Moreover, as discussed above, by playing the sound effect synchronously with one another, the toy devices 110, 115 and 120 can compensate for each other's weaknesses (e.g., a particular toy device being capable of outputting sounds within a limited frequency range), thereby producing an improved sound effect and sensorial immersion for the user.

While any number of toy devices can be used, the sense of immersion experienced by the user generally scales with the number of devices performing audiovisual effects in synchrony. For example, the controller 125 could detect when the user pulls the trigger to fire the blaster gun 115, and in response, could broadcast a command to all of the toy devices 110, 115 and 120 to output the sound effect of the blast being fired. Additionally, the controller 125 could instruct the toy devices 110, 115 and 120 to perform additional audiovisual effects, such as flashing lights and movements, in response to the user firing the blaster. Doing so helps to overload the user's senses, thereby creating a more immersive and realistic playtime experience.

Generally, a variety of techniques may be used to configure the toy devices 110, 115 and 120 to synchronously output the audiovisual effect. In one embodiment, the toy devices 110, 115 and 120 could be configured to output the audiovisual effect immediately upon receiving the command from the controller 125. Such an embodiment may be preferable when the toy devices 110, 115 and 120 receive the command at substantially the same time and when the toy devices 110, 115 and 120 take substantially the same amount of time to process the command and to perform the corresponding audiovisual effect. As another example, each of the toy devices 110, 115 and 120 (as well as the controller 125) could maintain an internal clock whose time is synchronized to the internal clock of the other toy devices, and the command transmitted by the controller 125 could specify a time at which to perform the audiovisual effect. Generally, any technique suitable for use in synchronizing the internal clocks may be used, consistent with the present disclosure. Examples of such techniques include, without limitation, Network Time Protocol (NTP), Precision Time Protocol (PTP), Reference Broadcast Time Synchronization, and so on.

Additionally, the controller 125 could be configured to selectively playback certain audio effects on the devices 110, 115 and 120, based on which device is best suited for the playback of each particular audio effect. For instance, a particular story could include audio effects representing dialogue from a virtual assistant, where the virtual assistant is not directly represented by any of the storytelling devices 110, 115 and 120 used in the playback of the story. As such, the controller 125 could select one of the storytelling devices 110, 115 and 120 that is best suited to output the audio effect with the highest quality sound. Thus, the controller 125 could determine that the toy blaster rifle 115 has the optimal speaker configuration and audio processing capabilities to output the sound effects representing the virtual assistant's dialogue and could transmit the corresponding audio data to the blaster rifle 115 for output.

Of note, the controller 125 can be configured to dynamically determine the optimal storytelling device(s) for outputting a particular sound effect, as the available storytelling devices can change from story to story and can even change within the playback of a single story. For example, during the playback of a particular story, the action figure 110 could run low on battery power and could be removed from the story as a result. As such, the controller 125 could remove the action figure 110 from consideration when subsequently placing audio effects. As another example, the user's friend could visit the user's house and could bring a fourth storytelling device into the playback of the story. As such, the controller 125 could consider the fourth storytelling device in addition to the devices 110, 115 and 120 when searching for an optimal device to output subsequent audio effects.

Figure 2:
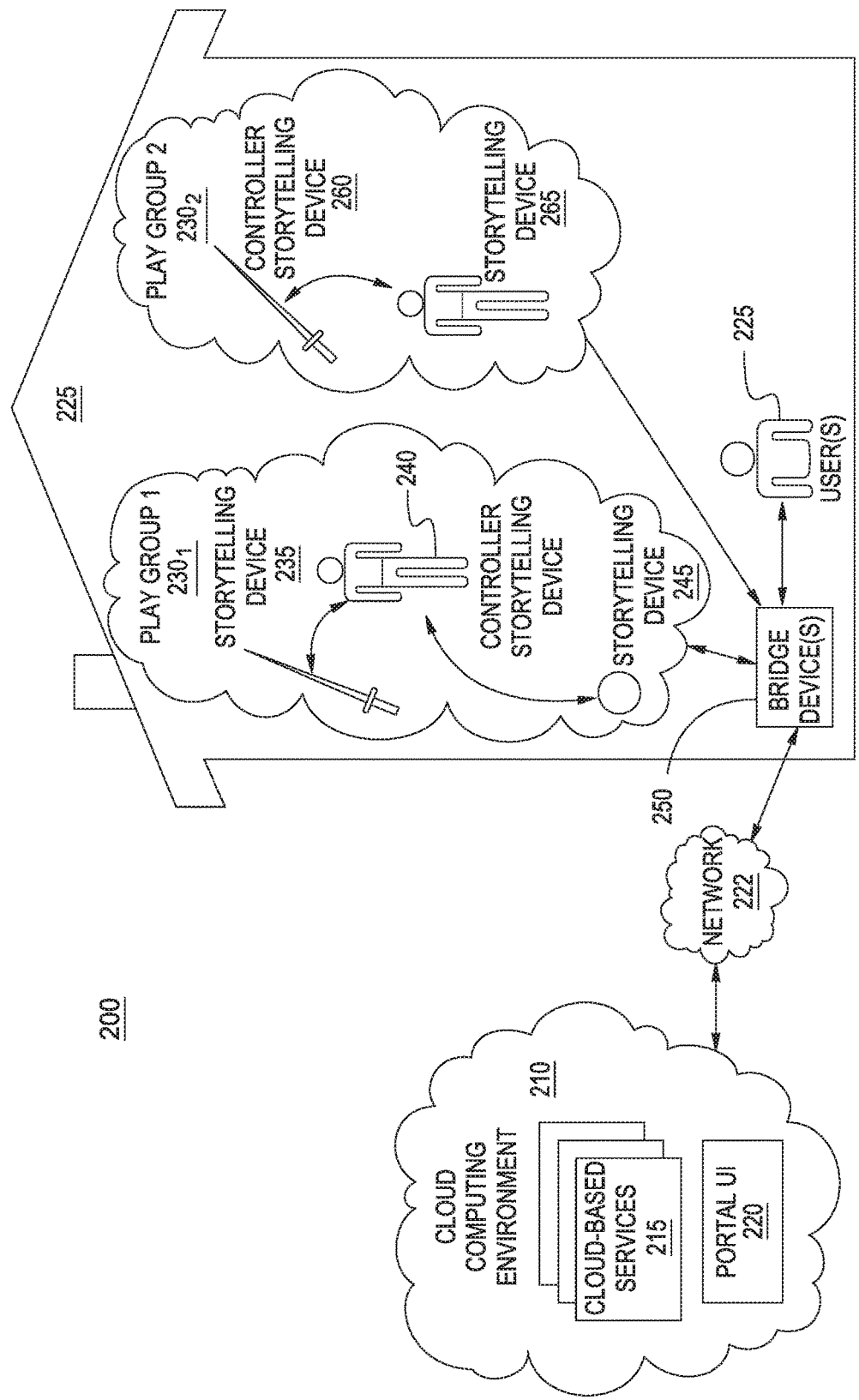
FIG. 2 illustrates a storytelling environment with a plurality of playgroups, according to one embodiment described herein.

FIG. 2 illustrates an example storytelling environment, according to one embodiment. As shown, the environment 200 includes a cloud computing environment 210 and a home environment 225, interconnected via network 222. The home environment 225 includes two playgroups $230_{1-2}$ of storytelling devices, as well as a user(s) 255 and a bridge device(s) 250. Here, the user may connect to the bridge device 250 via an application (e.g., executing on a mobile device, rendered within a web browser, etc.). The cloud computing environment 210 hosts a plurality of services 215 and a portal user interface 220.

Generally, cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. Doing so allows a user to access information and the services 215 from any computing system attached to a network connected to the cloud (e.g., the Internet).

Each playgroup $230_{1-N}$ generally represents a set of storytelling devices involved in a unique storytelling or playtime experience. For instance, the playgroup $230_1$ represents a science fiction-themed storytelling experience and includes a light sword storytelling device 235, an action figure controller storytelling device 240, and a trainer storytelling device 245. Likewise, the playgroup $230_2$ also represents a science fiction-themed storytelling experience and includes a light sword controller storytelling device 260 and an action figure storytelling device 265. More generally, however, the playgroups may contain any number of storytelling devices of any number of different themes and types.

Generally, the playgroups 230 include storytelling devices within a particular physical location (e.g., a room of the house environment 225). That is, it may be preferable for a storytelling experience to only interact with storytelling devices within its immediate physical proximity (e.g., within the same room), as to do otherwise can potentially create security and other problems during the storytelling experience. A number of different techniques may be used to determine which storytelling devices are within immediate physical proximity of one another. For example, one or more of the storytelling devices could emit a first signal (e.g., an infrared signal) and the other storytelling devices could be configured to transmit a response (e.g., a radio frequency signal (RF)) upon receiving the first signal. The storytelling device(s) could then receive the responses from the other storytelling devices and could create a playgroup 230 that includes the other storytelling devices as well as the one or more storytelling devices.

Generally, it is advantageous for the first signal to be transmitted using a technique that does not readily pass through barriers such as the walls of a house (e.g., emitting infrared light), so as to detect only nearby storytelling devices that are within the same physical environment as the storytelling device. That is, while particular signals (e.g., RF signals) may be suited for inter-device communications, these signals may not be ideal for detecting nearby storytelling devices as they may readily permeate through barriers such as the walls of the house. Doing so helps to ensure that a storytelling experience will not make use of storytelling devices in different rooms of a residence or potentially within different residences altogether.

As shown, the devices 240 and 260 have been elected as controller devices within the playgroups $230_{1-2}$. Generally, a controller device configures each of the storytelling devices within a playgroup to perform certain actions in response to a detected stimulus event and a current context of the story being told. Since acting as a controller device may result in more processing and data transmissions operations, serving as the controller device may also consume more battery power. As such, when two or more devices capable of serving as the controller device are present within a playgroup 230, embodiments can consider the current battery charge and battery capabilities of the capable devices when selecting one of the devices to serve as the controller.

As discussed above, devices can join and leave the playgroups 230 during the playback of a story. As such, the controller devices 240 and 265 can be configured to dynamically determine an optimal device(s) for the playback of a particular audio effect and can optimize the audio effect for playback on the determined device, based on the devices currently active within the respective playgroup 230. Doing so allows audio effects to be played back with the highest sound quality possible using the available devices, thereby enhancing the user experience during the story.

The story may include a number of different contexts in a temporal order, and the playback of the story may advance from one context to the next until the last context is reached and the storytelling experience is complete. However, while the story may be linear in progression, this is not necessary. For example, a story could have different branches, where the story can proceed down one of many possible arcs. For instance, arcs could be randomly selected, selected based on a user's request (e.g., the user specifying which arc should be taken), selected based on the user's actions (e.g., the user manages to "rescue" one of the fictional characters in the story), selected based on the user's history of actions (e.g., whether the user is trending towards the evil side in a science fiction storyline), and so on. Moreover, the story may be modified dynamically during playback based on various actions, such as one of the storytelling devices becoming unavailable (e.g., losing power, leaving the physical environment, etc.) or a new storytelling device being introduced to the environment (e.g., the user's friend comes over to play, bringing one or more new storytelling devices with him).

Additionally, the controller may maintain state information and control game logic for the playgroup 230. For example, playgroup 230$_1$ could be playing out a story in which a user is asked by the action figure device 240 to deflect virtual laser beams fired from the trainer device 245, using the light sword device 235. Here, the elected controller device (i.e., action figure 240) could maintain a "hit points" value for the user that is decremented when the user fails to deflect one of the virtual lasers, and could further maintain a count of how many virtual lasers the user has deflected thus far. Additionally, the controller could retrieve state data for the user (e.g., by querying one of the cloud-based services 215 with an identifier for the user) and could use the user state data to adjust the playback of the story.

In addition to detecting nearby storytelling device within the same physical environment, the storytelling devices within a playgroup 230 may elect one of the storytelling devices as a controller storytelling device. A number of different techniques may be used for such an election. For example, a user could explicitly specify that a particular one of the storytelling devices (e.g., the user's favorite device) should be used as the controller. It may be preferable for the user to select a device that will remain with the user throughout the storytelling experience, so as to avoid a subsequent controller election part-way through the story. In one embodiment, the controller may be elected based on technical specifications and properties of the storytelling devices. For example, a storytelling device with a substantial amount of memory, processing power and communication bandwidth may be preferable as the controller, relative to a device having a lesser amount of computing resources.

As discussed above, the story may generally include stimulus events and corresponding actions, and may be linear in progression or dynamic (e.g., a story that includes different story arcs or branches). In one embodiment, the story may be defined such that each corresponding action is attribute to a type or role of storytelling device (i.e., as opposed to a specific storytelling device). In mapping the story to the available and compatible storytelling devices, the controller device 220 could determine a type of each of the storytelling devices, and could assign particular stimulus events and corresponding actions to each of the storytelling devices based on the determined type. For example, a particular story could state that an action should be performed by a storytelling device having the role of "Hero", and the controller could map the action onto a storytelling device within the playgroup having the role "Hero".

For instance, assuming that the storytelling device 240 represents a first fictional character action figure, the controller 240 could assign any stimulus events and actions within the story that are specific to the fictional character to the action figure 240. Likewise, if the story includes any stimulus events and actions designated for a hero-type character in the science fiction universe, the controller 240 could assign these stimulus events and the corresponding actions to the device 240 as well. In the event multiple storytelling devices are available that satisfy the criteria for a stimulus event/action combination (e.g., multiple hero devices are present and available within the playgroup), the controller 240 could select one of the storytelling devices to perform each of the stimulus event/action combinations. The controller could use a number of different techniques for mapping the actions to the compatible devices, including a random mapping algorithm, a load balancing algorithm (e.g., round robin), user preferences (e.g., assigning more actions to a device the user has identified as his favorite), explicit user instructions (e.g., allowing a user to customize the story, such as selecting which character will narrate the story), and so on. In one embodiment, the controller is configured to consider the audio output and processing capabilities of the various compatible devices, when selecting one of the devices to perform a given action to a particular stimulus event. For example, when assigning a dialogue action to one of the devices, the controller could select a device capable of outputting the dialogue action with the greatest sound quality, in lieu of another device capable of outputting the dialogue with a relatively poor sound quality. Advantageously, dynamically mapping the story onto the available and compatible devices allows the story to be used with various different storytelling devices and combinations of storytelling devices.

In one embodiment, the story may specify a distinct, contextually appropriate action to perform for various types of storytelling devices for a given stimulus event. That is, the controller could determine that a particular story includes a stimulus event designated for a hero character, and could specify a corresponding action designated for a action figure 240 and a separate, distinct action designated for an different hero character-based device. In such an embodiment, upon selecting one of the devices to respond to the stimulus event, the controller could assign the corresponding action to the device based on the device's type. Doing so helps to create a more immersive and realistic storytelling experience for the user, as the storytelling devices can be configured to react to stimulus events in a manner appropriate for the represented fictional character.

Once the controller maps the story onto the devices, the controller configures each of the storytelling devices with a number of stimulus events and corresponding effects relating to a first context of the story. As an example, the action figure 240 could detect when the user has successfully deflected a virtual laser fired from the storytelling device 245 (i.e., an occurrence of the stimulus event), and could audibly congratulate the user in response (i.e., performing the corresponding effect).

In some cases, the controller (e.g., controller device 240) can map a particular audio effect to multiple devices for playback. The playback on the multiple devices can be done in unison or by using a time delay across the various devices.

For example, a slight time delay could improve the sound quality of a particular audio effect by avoiding phase cancellation of the audio output by the various devices. By doing so, the controller can achieve a stereoscopic or surround sound effect.

FIGS. 3A-D are diagrams illustrating an augmented reality headset configured to interact with a mobile device, according to embodiments described herein. As shown, the diagram 300 depicts a mobile device 310 and an augmented reality headset 320. The augmented reality headset 320 includes a headstrap 330, mobile device adapter 340, and a mirrored lens 350. Generally, the mobile device 310 is configured to couple to the augmented reality headset 320 by inserting the mobile device 310 into the mobile device adapter 340. The light from the display device of the mobile device 310 is then redirected so that the light can be seen by a wearer of the augmented reality headset 320. For example, the light could pass through a beam splitter, reflect off the mirrored lens 350 and into the user's eyes. Doing so enables objects displayed on the display device of the mobile device 310 to appear as if present within the physical environment. Advantageously, by leveraging the hardware resources of the mobile device 310, the augmented reality headset 320 can be sold at a reduced cost, relative to other augmented reality devices containing dedicated computer processors, display devices, and so on.

Figure 3A:
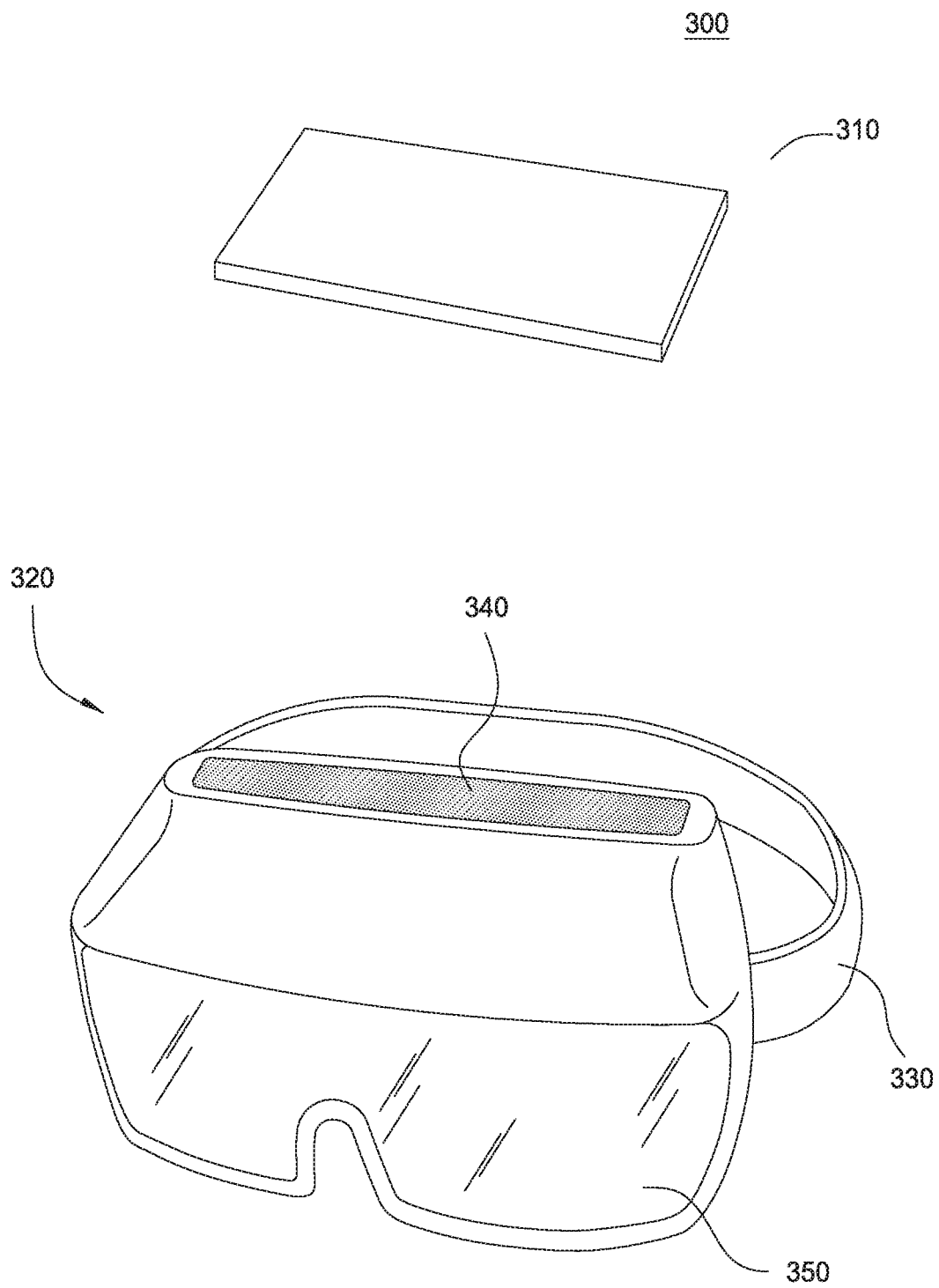
FIGS. 3A-D are diagrams illustrating an augmented reality headset configured to interact with a mobile device, according to embodiments described herein.
Figure 3B:
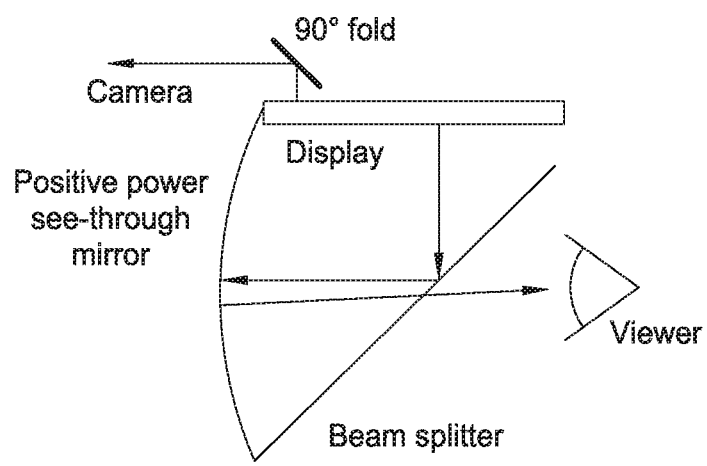

FIG. 3B provides an internal schematic for the augmented reality headset 320, according to one embodiment described herein. As shown in the diagram 375, the display of the smartphone is downward facing. That is, light produced by the smartphone display is transmitted downward, and is partially transmitted through the beam splitter and partially reflected by the beam splitter toward the positive power see-through mirror. The positive power see-through mirror may have any suitable reflectance, and the reflected light is directed toward the beam splitter. The reflected light may have a focus between about 1 meter and optical infinity. The beam splitter again partially transmits the incident light to the eye of the viewer.

The design shown in diagram 375 provides several benefits. The beam splitter of the optical arrangement has an orientation away from the eye of the viewer, which generally allows a more comfortable wear or use of the diagram 375. The design of diagram 500 also allows the focal length of the positive power see-through mirror to be significantly shorter, which reduces the overall size and weight of the optical arrangement. In some cases, the height of the optical arrangement (as viewed, top to bottom) may be on the order of two inches. Although not shown, the optical arrangement of diagram 500 may be small enough that only a portion of the smartphone display is provided to the viewer (e.g., a portion of the display extends forward of the positive power see-through mirror and away from the viewer). Of course, the illustration 375 is provided for illustrative purposes, and one of ordinary skill in the art will quickly recognize that numerous other designs and configurations are suitable for redirecting the light emitted from the display of the mobile device 310 to the eyes of the user.

Figure 3D:
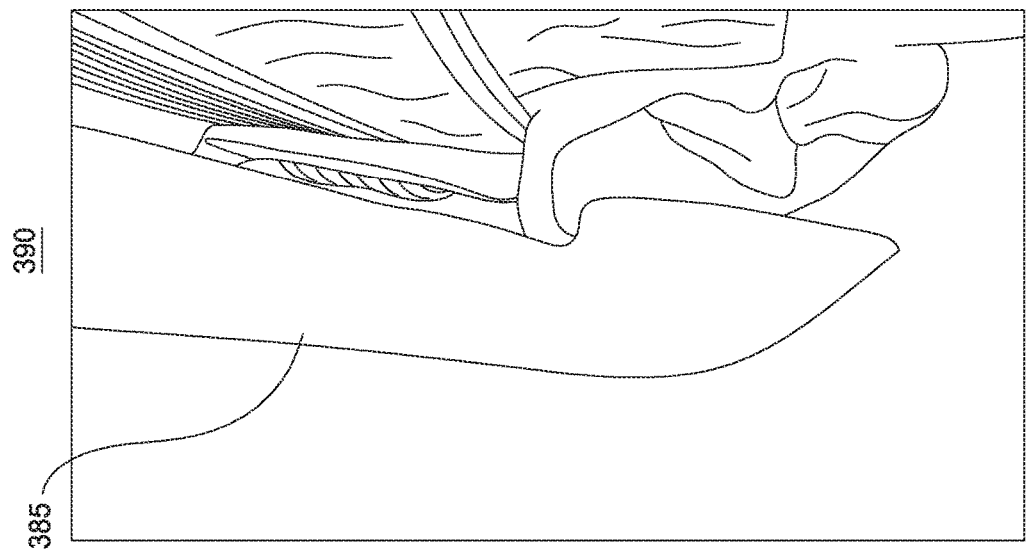
Figure 3C:
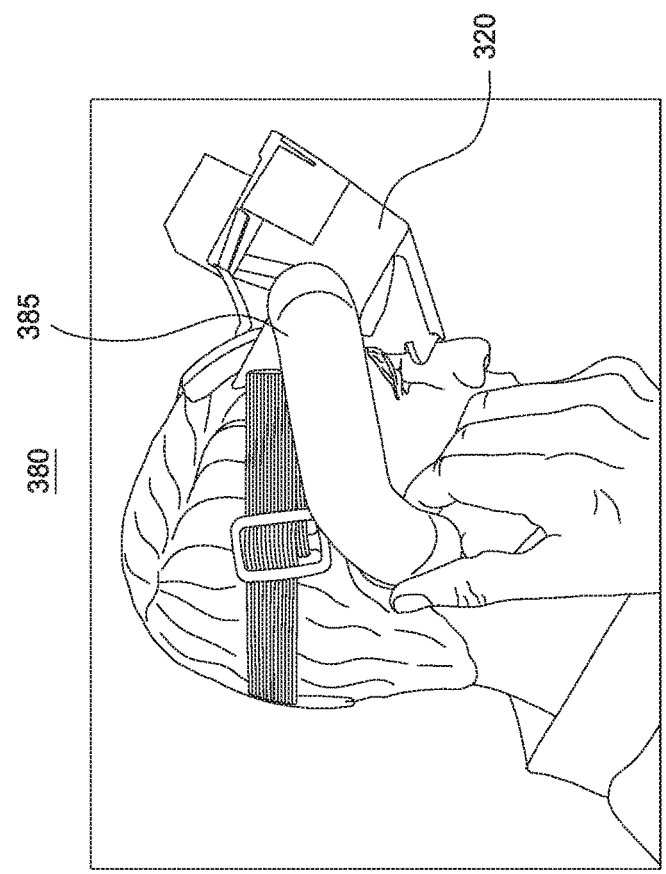

Oftentimes, mobile devices 310 include audio output devices (e.g., one or more speakers) and it may be desirable to use these devices to play various sound effects as part of an augmented reality gaming experience. However, while the volume, range and overall sound quality of these speakers may be satisfactory, the speakers may be oriented such that the sound is projecting away from the user's ears, which can cause the sound to be muffled and otherwise undesirable. As such, FIG. 3C is an illustration 380 showing an augmented reality headset 320 configured with a sound adapter 385. FIG. 3D is an illustration 390 that provides an alternate view of the sound adapter 385.

In the depicted embodiment, the sound adapter 385 is generally cylinder in shape and has a hollow interior portion through which the sound waves can travel. As shown in the illustrations 380 and 390, the sound adapter 385 is generally configured to redirect sound from the audio output device of the mobile device 310 to the user's ear(s). That is, the sound waves emitting from the audio output device are redirected from the speakers of the mobile device, to the user's ears, through the sound adapter 385. Doing so provides an improved experience for the user by improving the directionality of the sound output by the mobile device.

As discussed above, embodiments described herein provide techniques for calibrating an augmented reality headset 320 for a given user wearing the headset 320. Generally, the orientation of the user's eyes to the virtual objects shown within the augmented reality headset 320 can affect the user's experience while wearing the headset in a number of different ways. For instance, a user may experience discomfort when wearing an augmented reality headset 320, if the headset is not properly calibrated for the user. As an example, the headset 320 may fit the user properly, but the user's eyes may not properly align to the objects due to the user having a greater or lesser inter-pupillary distance (i.e., the distance between the user's eyes and the middle of the user's face), relative to the device's default configuration. As another example, the headset 320 may not fit the user properly, e.g., due to unevenness in the user's forehead.

Such misalignment may also affect the alignment of the virtual objects, relative to physical objects within the physical environment. That is, the augmented reality software executing on the mobile device 310 may render virtual objects at positions based on the user's eyes being properly aligned. However, due to the user's eyes being misaligned, the virtual objects may appear in different positions, relative to physical objects in the physical environment, when viewed by the user. Misalignment can also cause parallax errors (e.g., barrel distortion, pincushion distortion, etc.) of the virtual objects when viewed by the user wearing the augmented reality headset 320. This in turn can affect the user's enjoyment of the augmented reality headset 320, as virtual objects may appear to the user as located in unrealistic positions (e.g., within physical objects, standing off of physical surfaces, etc.) and as having unrealistic shapes.

Figure 4:
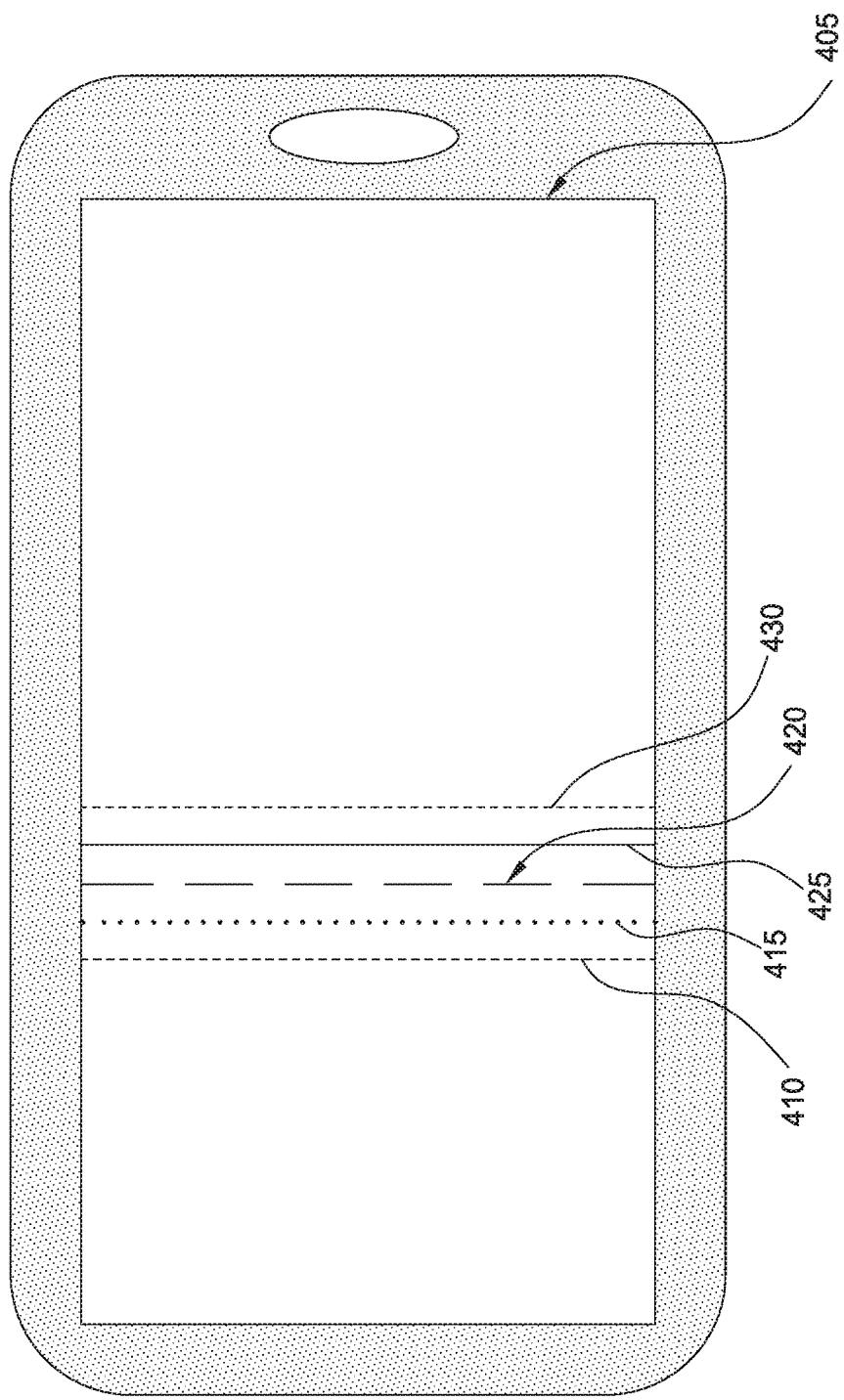
FIG. 4 illustrates a mobile device interface for calibrating the inter-pupillary distance of a user wearing an augmented reality headset, according to one embodiment described herein.

As such, embodiments provide techniques for calibrating an augmented reality headset 320 for a particular user. In one embodiment, a calibration component executing on the mobile device 310 is configured to output for display a plurality of reference lines and to provide an interface through which the wearer of the augmented reality headset can select one of the lines that appears closest to a physical reference marker. The calibration component for the augmented reality software could perform this operation for each eye of the user and for each physical reference marker on the display. An example of this is shown in FIG. 4, where the device 400 includes a display 405 that is showing virtual reference lines 410, 415, 420, 425 and 430. Generally, each of the virtual reference lines 410, 415, 420, 425 and 430 is visually distinct from the other virtual reference lines. For example, each of the virtual reference lines 410, 415, 420, 425 and 430 could be displayed in a distinct color.

Figure 5B:
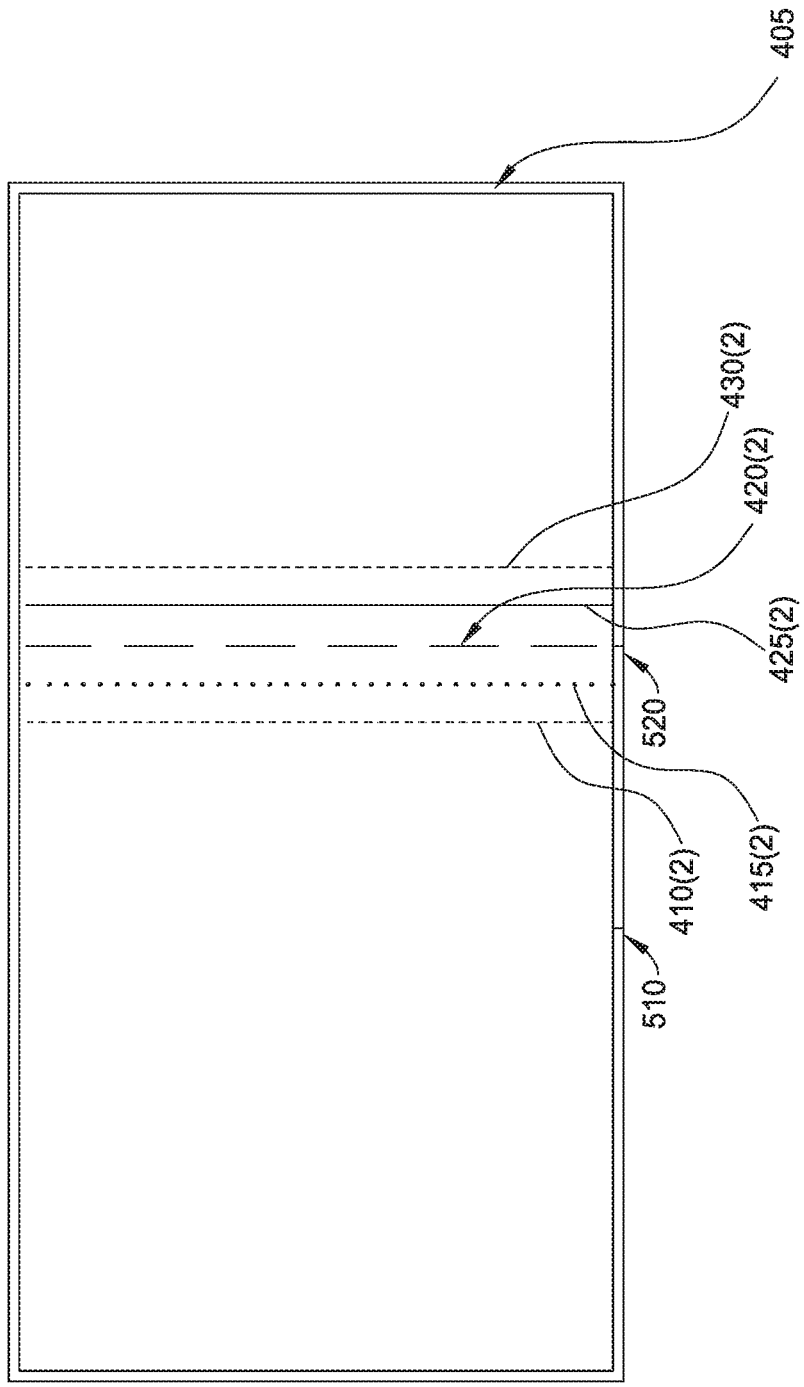

Two or more physical reference markers can be provided within an augmented reality headset 320. The wearer of the augmented reality headset could then select the virtual reference lines 410, 415, 420, 425 and 430 that appears closest to a physical reference marker of the augmented reality headset by speaking the color of the virtual reference line. An example of such reference markers is shown in FIGS. 5A-C, which illustrate a calibration operation being performed on a display of an augmented reality headset, according to embodiments described herein. For instance, as shown in FIG. 5A, the augmented reality headset display 405 includes the physical reference lines 510 and 520, and the reference lines 410, 415, 420, 425 and 430 are being displayed on the display screen of the headset device. The calibration component for the augmented reality software can then provide a user interface through which the user can select one of the reference lines 410, 415, 420, 425 and 430 that appears to the user as closest to the physical reference line 510 when viewed by a particular eye of the user.

The process can then be repeated for the user's other eye, as shown in FIG. 5B, where the reference lines 410(2), 415(2), 420(2), 425(2) and 430(2) are displayed near the physical reference marker 520. Thus, in the depicted example, the user could specify that the line 420(2) appears closest to the physical reference marker 520. The calibration component for the augmented reality software can then receive the user selection of the reference line that appears closest to the physical reference marker 520, and can use the selections to generate a calibration profile for the augmented reality headset. Of note, as the augmented reality headset may fit various users differently and each user's eyes can be positioned differently relative to the augmented reality headset, the calibration component for the augmented reality software can use the user's selections to determine how the current wearer of the augmented reality headset is viewing the augmented reality display and can calibrate the display accordingly.

In a particular embodiment, light-emitting diodes of various colors are used in the calibration operation. An example of such an embodiment is shown in FIG. 5C, where the augmented reality headset display 550 includes light-emitting diodes 560, 565, 570, 575, 580 and 585. Generally, each of the light-emitting diodes 560, 565, 570, 575, 580 and 585 can display light in a distinct color, and the calibration component for the augmented reality software can provide a user interface through which the user can specify which of the light-emitting diodes appears closest to the virtual reference line 555. The calibration component for the augmented reality software can then determine a calibration profile for the wearer of the augmented reality headset, based on predefined information specifying the physical positions of the light-emitting diodes 560, 565, 570, 575, 580 and 585 and predefined information specifying the fixed position of the virtual reference line 555. The calibration component for the augmented reality software can then use such a profile for rendering frames for display on the display screen of the augmented reality headset. Doing so helps to ensure virtual objects appear in the proper position on the augmented reality headset when viewed by the wearer of the headset.

Figure 6A:
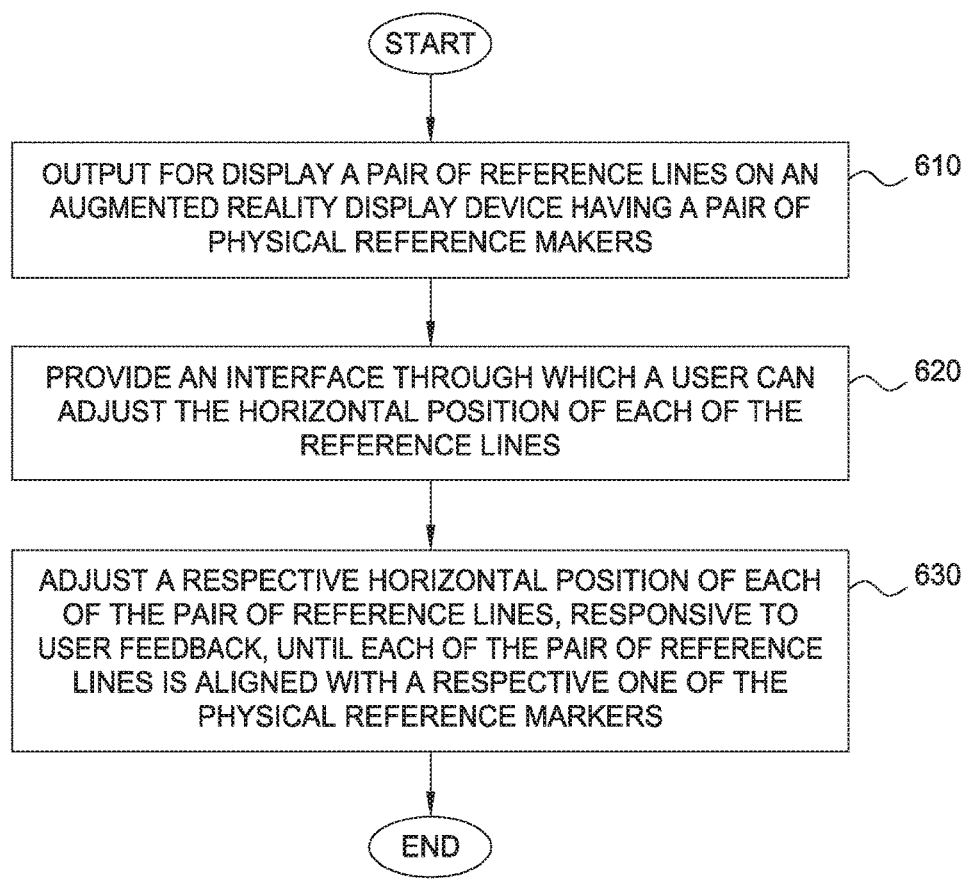
FIGS. 6A-B are flow diagrams illustrating methods for calibrating the inter-pupillary distance of a user using physical reference markers, according to embodiments described herein.
Figure 6B:
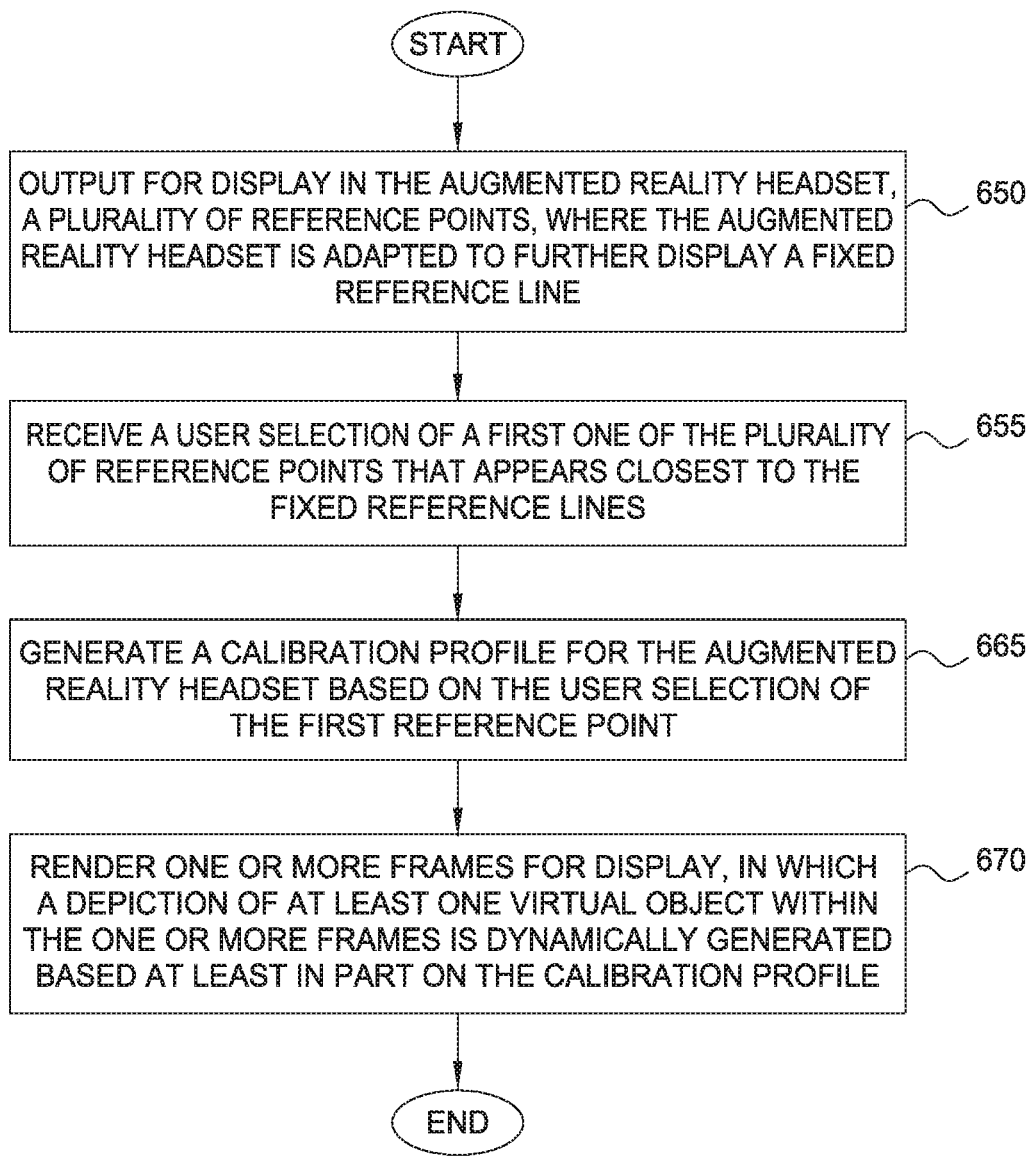

FIGS. 6A-B are flow diagrams illustrating methods for calibrating the inter-pupillary distance of a user using physical reference markers, according to embodiments described herein. As shown, FIG. 6A is a flow diagram illustrating a method for calibrating the inter-pupillary distance of a user using physical reference markers, according to one embodiment described herein. As shown, the method 600 begins at block 610, where a calibration component executing on a mobile device outputs a pair of reference lines for display on a display device of an augmented reality device having a pair of physical reference markers. The calibration component additionally provides an interface through which a user can adjust a horizontal position of each of the reference lines on the display (block 620). Generally, the user can continue adjusting the horizontal positions of the reference lines, until the reference lines are aligned with the respective physical reference markers. In one embodiment, the calibration component provides a verbal interface through which the user can speak commands. For instance, the user could say "go left" in order to move the reference lines depicted on the display in the leftward direction, and could say "go right" to move the reference lines in the rightward direction. As another example, the user could control an interactive device and the calibration component could monitor the movement of the interactive device using one or more sensors (e.g., an inertial measurement unit, an accelerometer, etc.) within the device. For instance, the user could orient a tip of the interactive device (e.g., a toy sword) in the leftward direction to move the reference lines in the leftward direction.

The calibration component continues to adjust the horizontal position of each of the reference lines in response to the user feedback, until each of the reference lines is aligned with the respective physical marker (block 630), and the method 600 ends. The augmented reality software on the mobile device could then use the positions of the adjusted reference lines to provide an improved augmented reality experience for the user wearing the headset. For example, the augmented reality software could determine a position of each of the user's eyes relative to the displayed images of the augmented reality headset, based on the positions of the adjusted reference lines and predefined information about the fixed positioning of the physical reference markers. The augmented reality software could then use this calibration information in rendering virtual objects for display in the augmented reality headset. For example, the augmented reality software could adjust the positioning of one or more virtual objects within a three-dimensional scene using the calibration information, so that the virtual objects appear to the user as properly positioned on a physical surface within the physical environment.

As another example, as discussed above, misalignment between the user's eyes and the augmented reality headset can result in parallax errors in virtual objects viewed by the user within the augmented reality headset. As such, the augmented reality software could use the calibration information as input to one or more shaders when rendering the virtual objects, in order to offset any parallax errors. For example, the augmented reality software could determine that the inter-pupillary distance for a particular user will result in a particular amount of pincushion distortion when a user views a virtual object displayed within the augmented reality headset. In response, the augmented reality software could apply a shader to apply a determined amount of barrel distortion to the virtual object, in order to offset the particular amount of pincushion distortion. As a result, the user of the augmented reality headset will see the rendered virtual object in its intended form, thereby improving the user's experience while wearing the augmented reality headset.

FIG. 6B is a flow diagram illustrating a method of configuring an augmented reality headset, according to one embodiment described herein. As shown, the method 640 begins at block 650 where the calibration component for the augmented reality software outputs for display in the augmented reality headset a plurality of reference points. The augmented reality headset is adapted to further display a fixed reference line. For example, the fixed reference line could be a physical reference line that appears, to a wearer of the augmented reality headset, as adjacent (e.g., above or below) the display of the augmented reality headset. As another example, the fixed reference line could be a virtual reference line displayed on the display device of the augmented reality headset in a fixed position.

The calibration component for the augmented reality software receives a user selection of a first one of the plurality of reference points that appears closest to the fixed reference line (block 655). For instance, the plurality of reference points could be virtual reference lines that are displayed in different colors on the display screen of the augmented reality headset, and the user could speak the color of the reference line that appears closest to a physical reference line adjacent to the display. As another example, the plurality of reference points could be illuminated light-emitting diodes adjacent to the display screen of the augmented reality headset, and the user could speak the color of the light-emitting diode that appears closest to a virtual reference line shown on the display screen of the augmented reality headset.

The calibration component for the augmented reality software generates a calibration profile for the augmented reality headset based on the user selection of the first reference point (block 665). For example, the augmented reality software could determine a position of each of the user's eyes, relative to the display of the augmented reality headset, based on the user's selection and data describing the predefined position of the fixed reference line. The augmented reality software then renders one or more frames for display, in which a depiction of at least one virtual object within the one or more frames is dynamically generated based at least in part on the calibration profile (block 670), and the method 640 ends.

In a particular embodiment, the calibration component within the augmented reality software executing on the mobile device 310 is configured to use a forward-facing camera sensor on the mobile device 310 in calibrating the augmented reality software. For example, the calibration component could be preconfigured with data specifying a known distance between the user's face and the display surface (e.g., the positive power see-through mirrored surface shown in FIG. 3B and discussed above) of the augmented reality headset 320, when the user is properly wearing the augmented reality headset 320. The calibration component could then retrieve an image captured using the forward-facing camera sensor, while the user is wearing the augmented reality headset 320.

The calibration component could use such an image to determine a position of each of the user's eyes, relative to the display surface of the augmented reality headset 320. For instance, the calibration component could be preconfigured data describing an average eye size for users of the augmented reality headset 320. The calibration component could process the image using a detection algorithm to identify the user's eyes within the image. For example, as the camera sensor is generally in a fixed position relative to the user's face, the calibration component could be configured to identify an eye region of the captured image for each of the user's eyes (i.e., a general area of the image in which the eyes are depicted). The calibration component could then perform a pupil detection algorithm for each of the identified eye regions to determine the location of the user's pupils within the region (and within the captured image as a whole).

The calibration component could then use this information, together with the data specifying a known distance between the user's face and the display surface of the augmented reality headset 320, to calibrate the augmented reality software on the mobile device 310. That is, the calibration component could determine a position of each of the user's eyes, relative to the display surface of the augmented reality headset 320, and the augmented reality software on the mobile device 310 could use this information to place, scale and size virtual objects depicted in the frames rendered and displayed by the mobile device 310.

As discussed above, misalignment between the user's eyes and the augmented reality headset can result in parallax errors in virtual objects viewed by the user within the augmented reality headset 320. As such, the augmented reality software could use the calibration information as input to one or more shaders when rendering the virtual objects, in order to offset any parallax errors. For example, the augmented reality software could determine that the placement of a particular user's eyes, relative to the display surface of the augmented reality headset 320, will result in a particular amount of barrel distortion when a user views a virtual object displayed within the augmented reality headset 320. In response, the augmented reality software could apply a shader to apply a determined amount of pincushion distortion to the virtual object, in order to offset the particular amount of pincushion distortion. As a result, the user of the augmented reality headset 320 will see the rendered virtual object in its intended form, thereby improving the user's experience while wearing the augmented reality headset.

Additionally, the augmented reality software could adjust a position of a virtual object within a three-dimensional virtual scene, based on the relative position of the user's eyes to the display surface of the augmented reality headset 320. That is, as the position of the user's eyes changes relative to the display surface, the position of the virtual objects depicted on the display surface of the augmented reality headset 320 changes relative to the position of physical objects within the physical environment. As it can be desirable to position such virtual objects relative to a physical object (e.g., a virtual character can be shown as standing upon a physical surface, such as a table top or a floor), such changes in relative position between the virtual objects and the physical objects can negatively affect the user's experience. For instance, a virtual character can appear to be partially within a table or floating above the table surface, rather than standing upon the table surface. As such, the augmented reality software on the mobile device 310 can determine the change in position that the user will see when viewing virtual objects on the display surface of the augmented reality headset 320, based on the relative positioning between the user's eyes and the display surface, and can adjust the positioning of the virtual objects within the three-dimensional scene in order to offset this change in position. For instance, if the user's inter-pupillary distance would cause the user to see virtual objects shifted a particular distance to the left, the augmented reality software could reposition the virtual objects within the three-dimensional scene in order to shift the objects the particular distance to the right when viewed. Doing so improves the user's experience while wearing the augmented reality headset 320, as virtual objects will appear to the user in the intended position.

In one embodiment, the calibration component is configured to perform the calibration operations discussed above in a repeated fashion. Such an embodiment may be preferable, as the orientation of the user's eyes to the display surface of the augmented reality headset 320 may change over time, e.g., as the positioning of the augmented reality headset 320 on the user's head can shift slightly as the user moves or adjusts the fit of the augmented reality headset 320. As another example, in some embodiments the mobile device 310 may shift slightly within the housing provided by the mobile device adapter within the augmented reality headset. As such, the calibration component can be configured to perform the calibration operation in a continuous fashion (e.g., at a set interval of time) to ensure that objects displayed within the augmented reality headset 320 are properly calibrated for the user. In one embodiment, the augmented reality component on the mobile device is configured to periodically perform a calibration test to ensure that the augmented reality headset 320 remains calibrated. For instance, the augmented reality component could output for display a pair of reference indicators and could ask the user to confirm that the reference indicators are properly aligned with physical reference markers within the headset. If the user indicates (e.g., by providing voice feedback that is captured using one or more microphone sensors of the mobile device) that the reference indicators are not properly aligned, the augmented reality component could instruct the calibration component to recalibrate the augmented reality headset 320 for the particular user, e.g., by initiating a calibration operation as discussed above.

Technical Description

Figure 7:
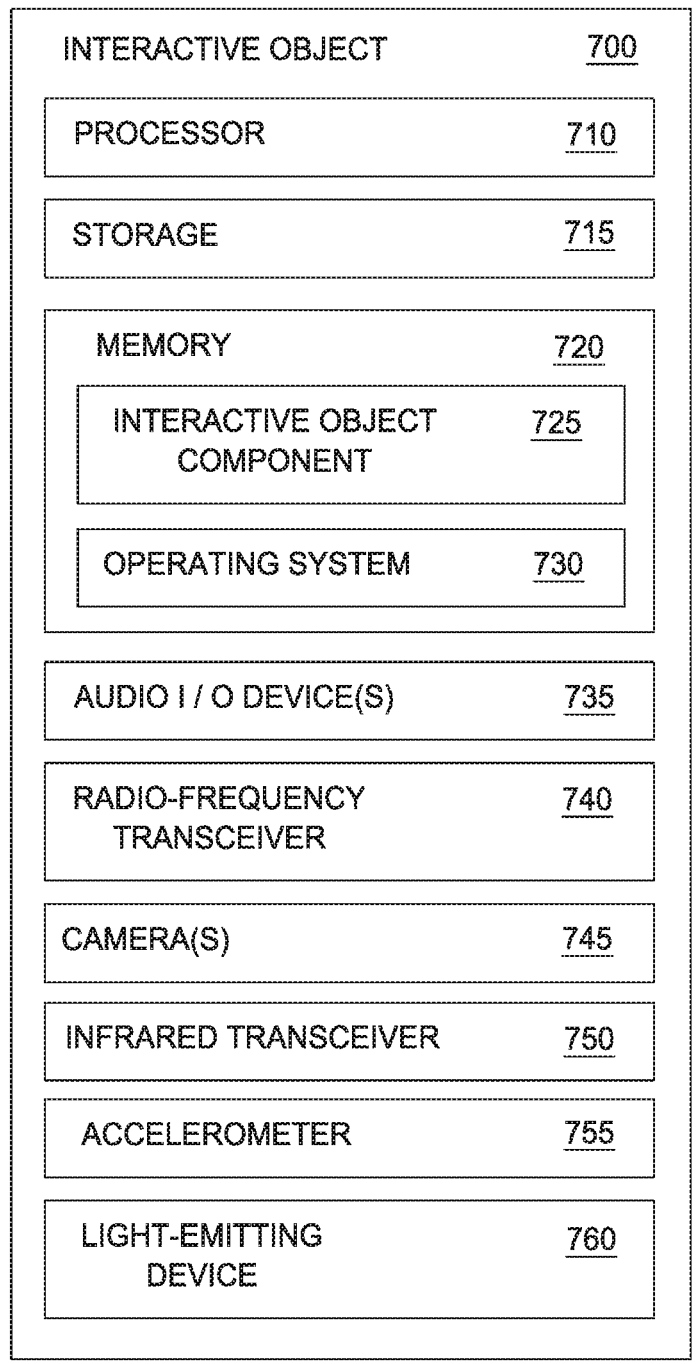
FIG. 7 is a block diagram illustrating an interactive object, according to one embodiment described herein.

An example of an interactive device is shown in FIG. 7, which is a block diagram illustrating an interactive device configured with an interactive object component, according to one embodiment described herein. In this example, the device 700 includes, without limitation, a processor 710, storage 715, memory 720, audio input/output (I/O) device(s) 735, a radio-frequency (RF) transceiver 740, a camera device(s) 745, an infrared transceiver 750, an accelerometer device 755, and a light-emitting device 760. Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The radio-frequency transceiver 740 enables the interactive object component 725 to connect to a data communications network (e.g., wired Ethernet connection or an 802.11 wireless network). As discussed above, the interactive device may include one or more battery devices (not shown).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 7, the memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the interactive device 700. Illustratively, the memory 720 includes an interactive object component 725 and an operating system 730. The interactive object component 725 could be configured to receive commands (e.g., encoded in RF or infrared signals) and to execute the commands to perform audiovisual effects. In one embodiment, the interactive object component 725 is configured to decrypt the commands using a received key before executing the commands. The operating system 730 generally controls the execution of application programs on the interactive device 700. Examples of operating system 730 include UNIX, a version of the Microsoft Windows® operating system, and distributions of the Linux® operating system. Additional examples of operating system 730 include custom operating systems for gaming consoles, including the custom operating systems for systems such as the Nintendo DS® and Sony PSP®.

The infrared transceiver 750 represents any device capable of sending and receiving infrared signals. In another embodiment, a device 700 that only sends or receives infrared signals may be configured with an infrared transmitter or a infrared receiver, respectively, as opposed to the infrared transceiver 750. The sound I/O devices 735 could include devices such as microphones and speakers. For example, the speakers could be used to produce sound effects (e.g., explosion sound effects, dialogue, etc.) and/or to produce vibration effects.

Generally, the interactive object component 725 provides logic for the interactive device 700. For example, the interactive object component 725 could be configured to detect that a coded infrared signal has been received (e.g., using the infrared transceiver 750). The interactive object component 725 could then determine a type of the infrared signal (e.g., based on data specified within the coded infrared signal) and could determine a corresponding response based on determined type. For example, the interactive object component 725 could determine that the infrared signal specifies that a ray blast sound effect should be played, and, in response, could output the specified sound effect using audio I/O devices 735. As another example, the signal could be encoded with data specifying that a particular lighting effect should be displayed according to a specified schedule (e.g., at a particular point in time), and the interactive object component 725 could monitor the schedule (e.g., using an internal clock) and could activate the appropriate light-emitting device 760 at the appropriate time.

Figure 8:
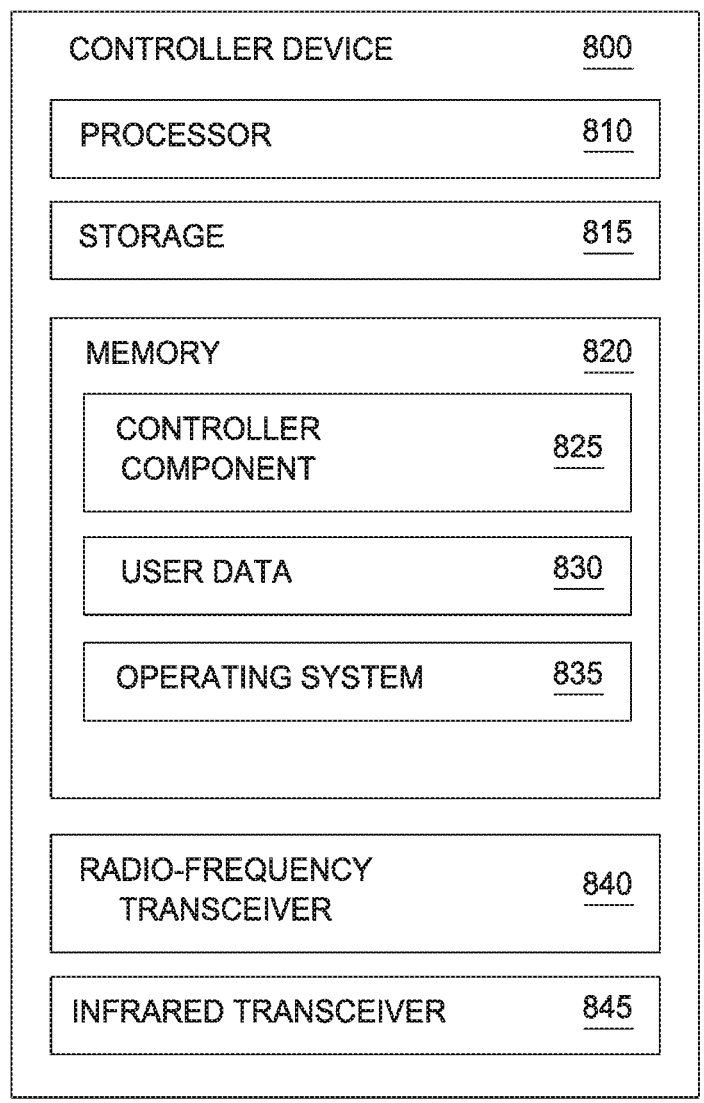
FIG. 8 is a block diagram illustrating a controller device, according to one embodiment described herein.

FIG. 8 illustrates an example of a controller device, according to one embodiment described herein. As shown, the controller 800 includes a processor 810, storage 815, memory 820, a radio-frequency transceiver 840 and an infrared transceiver 845. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The radio-frequency transceiver 840 enables the controller device 800 to transmit and receive radio-frequency signals. Likewise, the infrared transceiver 845 allows the device 800 to transmit and receive infrared signals. Further, while the depicted embodiment illustrates the components of a particular controller device 800, one of ordinary skill in the art will recognize that interactive objects may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the controller device 800. Illustratively, the memory 820 includes a controller component 825, user data 830 and an operating system 835. The operating system 835 generally controls the execution of application programs on the controller device 800. Examples of operating system 835 include UNIX, a version of the Microsoft Windows® operating system, and distributions of the Linux® operating system. Additional examples of operating system 835 include custom operating systems for gaming consoles, including the custom operating systems for systems such as the Nintendo DS® and Sony PSP®.

Generally, the controller component 825 configures the interactive objects (e.g., toys 110, 115 and 120, or an action disc device 200) to perform particular actions. The particular actions can also be based on the user data 830 (e.g., historical interactions data between the user and various interactive objects, user preferences data, etc.) and one or more environmental factor (e.g., a room of the house the object is currently in, a time of day, a day of the week, etc.). For instance, in one embodiment, the controller component 825 is configured with logic for recognizing particular events and broadcasting commands for the devices to perform a corresponding action(s) in response. In such an embodiment, the controller component 825 could use input/output devices (e.g., cameras, microphones, wireless transceivers, infrared sensors, etc.) to detect when a particular event occurs. For instance, the controller component 825 could use a camera to detect when a particular projection appears, and could then broadcast a command (e.g., using a RF signal) instructing the devices to perform a corresponding action in response. As another example, the controller component 825 could receive a wireless signal (e.g., an RF signal, data communicated using Bluetooth communications, etc.) from another one of the devices, indicating that a particular action has been performed. The device could then broadcast a signal instructing one or more other devices to perform a corresponding action responsive to receiving the signal.

In a particular embodiment, the controller component 825 is configured to control the actions of multiple devices to cause the devices to perform audiovisual effects synchronously. For instance, the controller component 825 could broadcast a message to the devices, instructing the devices to perform a particular audiovisual effect immediately upon receiving the message. As another example, the controller component 825 could broadcast a message to the devices, instructing the devices to perform actions (e.g., play a sound effect, trigger a lighting effect, etc.) according to a schedule. Here, the devices may maintain internal clocks that are synchronized with one another for use in synchronously performing the audiovisual actions.

As discussed above, the controller component 825 can be configured to dynamically optimize the playback of audio on various interactive devices used in the playback of the story. Such alterations can include, without limitation, variable bit rate encodings of audio files, generating audio data using MIDI control operations, applying equalization parameters to alter audio data, scheduling multiple devices to output sound effects according to a schedule to give the impression of stereophonic or surround-sound, and so on. Doing so helps to provide a more immersive soundscape during the playback of a story.

Generally speaking, the devices and the controller 800 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

Figure 9:
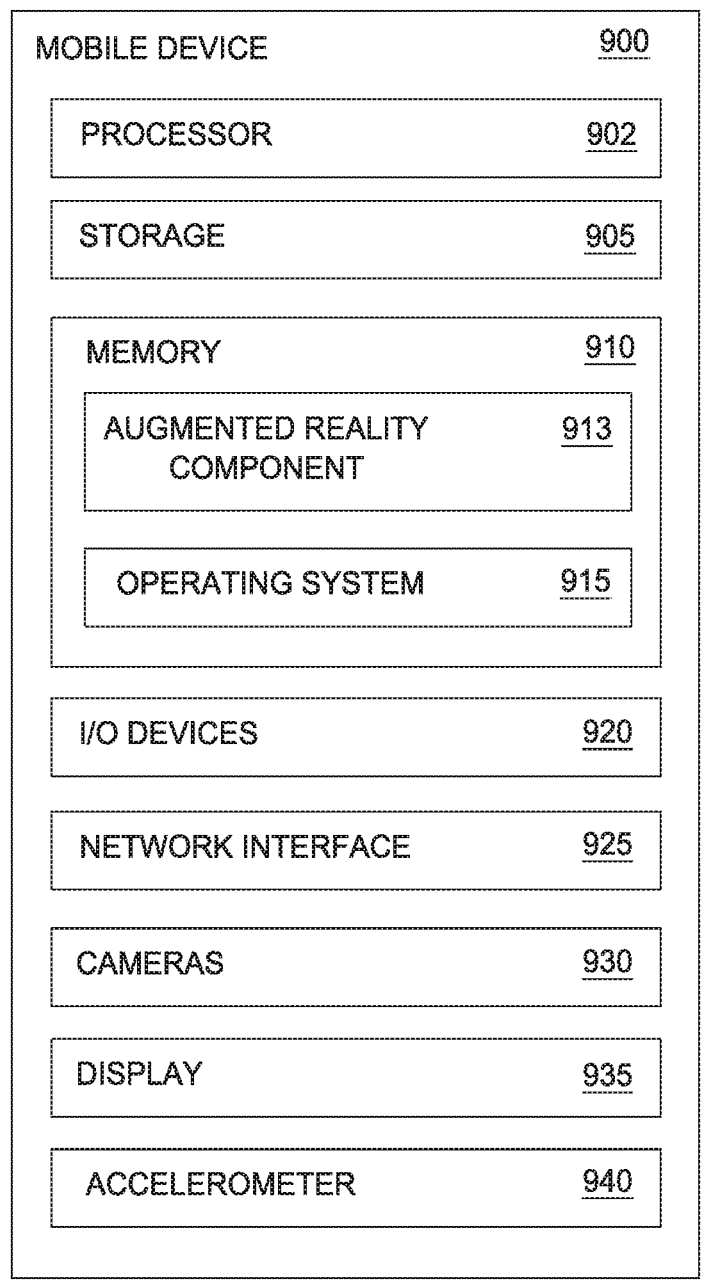
FIG. 9 is a block diagram illustrating a mobile device configured with an augmented reality component, according to one embodiment described herein.

FIG. 9 is a block diagram illustrating a mobile device configured with an augmented reality component, according to one embodiment described herein. In this example, the mobile device 900 includes, without limitation, a processor 902, storage 905, memory 910, I/O devices 920, a network interface 925, camera devices 930, a display devices 935 and an accelerometer device 940. Generally, the processor 902 retrieves and executes programming instructions stored in the memory 910. Processor 902 is included to be representative of a single CPU, multiple CPUs, a single CPU having multiple processing cores, GPUs having multiple execution paths, and the like. The memory 910 is generally included to be representative of a random access memory. The network interface 925 enables the mobile device 900 to connect to a data communications network (e.g., wired Ethernet connection or an 802.11 wireless network). Further, while the depicted embodiment illustrates the components of a particular mobile device 900, one of ordinary skill in the art will recognize that augmented reality devices may use a variety of different hardware architectures. Moreover, it is explicitly contemplated that embodiments of the invention may be implemented using any device or computer system capable of performing the functions described herein.

The memory 910 represents any memory sufficiently large to hold the necessary programs and data structures. Memory 910 could be one or a combination of memory devices, including Random Access Memory, nonvolatile or backup memory (e.g., programmable or Flash memories, read-only memories, etc.). In addition, memory 910 and storage 905 may be considered to include memory physically located elsewhere; for example, on another computer communicatively coupled to the mobile device 900. Illustratively, the memory 910 includes an augmented reality component 913 and an operating system 915. The operating system 915 generally controls the execution of application programs on the augmented reality device 900. Examples of operating system 915 include UNIX, a version of the Microsoft Windows® operating system, and distributions of the Linux® operating system. Additional examples of operating system 915 include custom operating systems for gaming consoles, including the custom operating systems for systems such as the Nintendo DS® and Sony PSP®.

The I/O devices 920 represent a wide variety of input and output devices, including displays, keyboards, touch screens, and so on. For instance, the I/O devices 920 may include a display device used to provide a user interface. As an example, the display may provide a touch sensitive surface allowing the user to select different applications and options within an application (e.g., to select an instance of digital media content to view). Additionally, the I/O devices 920 may include a set of buttons, switches or other physical device mechanisms for controlling the augmented reality device 900. For example, the I/O devices 920 could include a set of directional buttons used to control aspects of a video game played using the augmented reality device 900.

Figure 10:
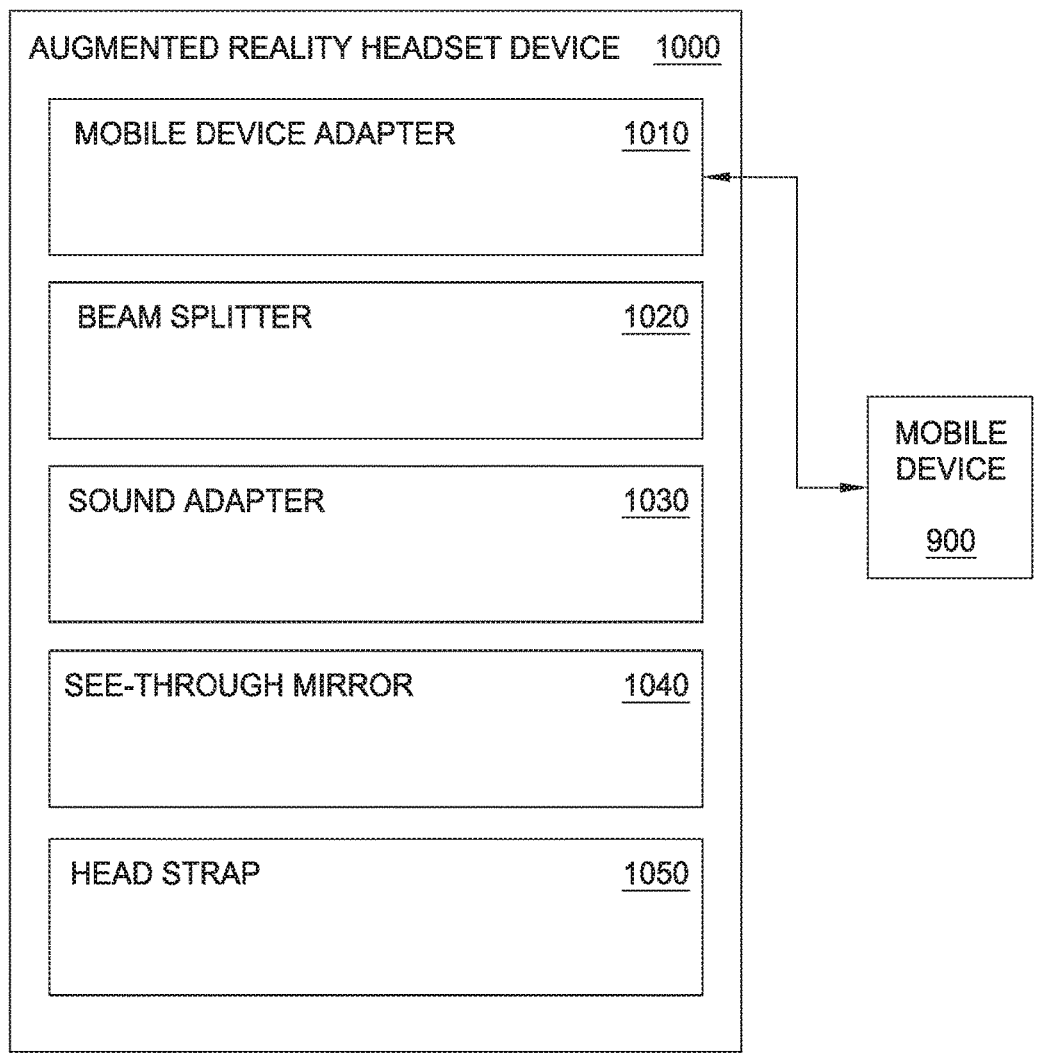
FIG. 10 is a block diagram illustrating an augmented reality headset, according to one embodiment described herein.

FIG. 10 is a block diagram illustrating an augmented reality headset, according to one embodiment described herein. The augmented reality headset 1000 includes a mobile device adapter 1010, a beam splitter 1020, a sound adapter 1030, a see-through mirror 1040 and a headstrap 1050. Generally, the augmented reality headset device 1000 is configured to interface with a mobile device 900, by way of the mobile device adapter 1010. For example, the mobile device adapter 1010 could be a slot within the augmented reality headset 1000 configured to hold the mobile device 900. The beam splitter 1020 and see-through mirror 1040 are generally arranged in such a way as to project light from the display device 935 of the mobile device 900 to the user's eyes, when the user views the physical environment while wearing the augmented reality headset 1000. For example, the beam splitter 1020 and see-through mirror 1040 could be arranged in the configuration shown in FIG. 3B and discussed above. More generally, however, any configuration suitable for providing an augmented reality display using the light from the display device 935 of the mobile device 900 can be used, consistent with the functionality described herein. The headstrap 1050 generally is used to secure the augmented reality headset 900 to the user's head. More generally, however, any mechanism (e.g., temples that rest atop the user's ears) for securing the augmented reality headset 900 can be used.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional embodiments are described in the attached Appendices A-D, which are hereby incorporated by reference in their entirety. While the foregoing is directed to embodiments of the present invention, other and further embodiments of the invention may be devised without departing from the basic scope thereof, and the scope thereof is determined by the claims that follow.

What is claimed is:

1. A method of calibrating an augmented reality headset, the method comprising:
outputting for display in the augmented reality headset, a plurality of reference points, wherein the augmented reality headset is adapted to further display a fixed reference line, wherein each of the plurality of reference points comprises a respective one of a plurality of illuminated light-emitting diodes, wherein each of the plurality of illuminated light-emitting diodes has a distinct color among the plurality of illuminated light-emitting diodes;
receiving a user selection of a first one of the plurality of reference points that appears closest to the fixed reference line;
generating a calibration profile for the augmented reality headset based on the user selection of the first reference point, the calibration profile describing a relative position of a wearer's eye with respect to a display of the augmented reality headset; and
rendering one or more frames for display, in which a depiction of at least one virtual object within the one or more frames is dynamically generated based at least in part on the calibration profile.

2. The method of claim 1, wherein the fixed reference line further comprises a physical reference line positioned at least one of above and below a display device of the augmented reality headset.

3. The method of claim 2, wherein the augmented reality headset comprises a mobile device adapter adapted to hold an inserted mobile device, wherein the display device is a display screen of the inserted mobile device.

4. The method of claim 3, wherein the augmented reality headset further comprises a beam splitter and a see-through mirror configured to redirect light from the display screen of the inserted mobile device to a view of a wearer of the augmented reality headset.

5. The method of claim 1, wherein each of the plurality of reference points comprises a respective vertical line on a graphical user interface of the augmented reality headset.

6. The method of claim 1, wherein the fixed reference line comprises a vertical line displayed in a fixed position on a graphical user interface of the augmented reality headset.

7. The method of claim 6, wherein receiving the user selection further comprises:
capturing user speech data using one or more microphone sensor devices of the augmented reality headset; and
performing a speech-to-text analysis of the captured user speech data in order to determine which of the plurality of illuminated light-emitting diodes corresponds to the captured user speech data.

8. The method of claim 1, wherein generating the calibration profile for the augmented reality headset comprises:
determining a first eye position of a wearer of the augmented reality headset, relative to a display surface of the augmented reality headset, based on the user selection of the first reference point being closest to the fixed reference line.

9. The method of claim 1, wherein the calibration profile generated based on the user selection of the first reference point defines calibration information for a first eye of a wearer of the augmented reality headset, and wherein the limitations of outputting, receiving and generating are repeated for a second eye of the wearer of the augmented reality headset.

10. The method of claim 1, wherein rendering the one or more frames for display, in which the depiction of the at least one virtual object within the one or more frames is dynamically generated based at least in part on the calibration profile, further comprises:
configuring one or more shaders, using the calibration profile, to offset any parallax errors when the one or more frames are viewed by a wearer of the augmented reality headset.

11. The method of claim 1, wherein the fixed reference line comprises one of a plurality of physical reference lines, wherein rendering the one or more frames for display, in which the depiction of the at least one virtual object within the one or more frames is dynamically generated based at least in part on the calibration profile, further comprises:
adjusting a view point of a virtual scene, based on the user selection of the first reference point and based further on predefined data indicating a fixed position of at least one of the plurality of physical reference lines.

12. A non-transitory computer-readable medium containing computer program code that, when executed by operation of one or more computer processors, performs an operation for calibrating an augmented reality headset, the operation comprising:
outputting for display in the augmented reality headset, a plurality of reference points, wherein the augmented reality headset is adapted to further display a fixed reference line, wherein each of the plurality of reference points comprises a respective one of a plurality of illuminated light-emitting diodes, wherein each of the plurality of illuminated light-emitting diodes has a distinct color among the plurality of illuminated light-emitting diodes;

receiving a user selection of a first one of the plurality of reference points that appears closest to the fixed reference line;

generating a calibration profile for the augmented reality headset based on the user selection of the first reference point, the calibration profile describing a relative position of a wearer's eye with respect to a display of the augmented reality headset; and rendering one or more frames for display, in which a depiction of at least one virtual object within the one or more frames is dynamically generated based at least in part on the calibration profile.

13. The non-transitory computer-readable medium of claim 12, wherein the fixed reference line further comprises a physical reference line positioned at least one of above and below a display device of the augmented reality headset.

14. The non-transitory computer-readable medium of claim 13, wherein the augmented reality headset comprises a mobile device adapter adapted to hold an inserted mobile device, wherein the display device is a display screen of the inserted mobile device, and wherein the augmented reality headset further comprises a beam splitter and a see-through mirror configured to redirect light from the display screen of the inserted mobile device to a view of a wearer of the augmented reality headset.

15. The non-transitory computer-readable medium of claim 12, wherein the fixed reference line comprises a vertical line displayed in a fixed position on a graphical user interface of the augmented reality headset, and wherein receiving the user selection further comprises:

capturing user speech data using one or more microphone sensor devices of the augmented reality headset; and performing a speech-to-text analysis of the captured user speech data in order to determine which of the plurality of illuminated light-emitting diodes corresponds to the captured user speech data.

16. The non-transitory computer-readable medium of claim 12, wherein generating the calibration profile for the augmented reality headset comprises:

determining a first eye position of a wearer of the augmented reality headset, relative to a display surface of the augmented reality headset, based on the user selection of the first reference point being closest to the fixed reference line.

17. The non-transitory computer-readable medium of claim 12, wherein the fixed reference line comprises one of a plurality of physical reference lines, wherein rendering the one or more frames for display, in which the depiction of the at least one virtual object within the one or more frames is dynamically generated based at least in part on the calibration profile, further comprises:

configuring one or more shaders, using the calibration profile, to offset any parallax errors when the one or more frames are viewed by a wearer of the augmented reality headset; and adjusting a view point of a virtual scene, based on the user selection of the first reference point and based further on predefined data indicating a fixed position of at least one of the plurality of physical reference lines.

18. An augmented reality headset, comprising:

one or more computer processors; and a memory containing computer program code that, when executed by operation of the one or more computer processors, performs an operation for calibrating the augmented reality headset, the operation comprising:

outputting for display in the augmented reality headset, a plurality of reference points, wherein the augmented reality headset is adapted to further display a fixed reference line, wherein each of the plurality of reference points comprises a respective one of a plurality of illuminated light-emitting diodes, wherein each of the plurality of illuminated light-emitting diodes has a distinct color among the plurality of illuminated light-emitting diodes;

receiving a user selection of a first one of the plurality of reference points that appears closest to the fixed reference line;

generating a calibration profile for the augmented reality headset based on the user selection of the first reference point, the calibration profile describing a relative position of a wearer's eye with respect to a display of the augmented reality headset; and rendering one or more frames for display, in which a depiction of at least one virtual object within the one or more frames is dynamically generated based at least in part on the calibration profile.

19. The augmented reality headset of claim 18, wherein the fixed reference line further comprises a physical reference line positioned at least one of above and below a display device of the augmented reality headset.

20. The augmented reality headset of claim 18, wherein each of the plurality of reference points comprises a respective vertical line on a graphical user interface of the augmented reality headset.

* * * * *